US012671514B2

(12) United States Patent　　(10) Patent No.:　US 12,671,514 B2
　　Izumi et al.　　　　　　　　　　(45) Date of Patent:　　Jun. 30, 2026

(54) INFORMATION PROCESSING APPARATUS, INFORMATION PROCESSING TERMINAL, DELIVERY METHOD, AND TIME SYNCHRONIZATION METHOD

(71) Applicant: SONY GROUP CORPORATION, Tokyo (JP)

(72) Inventors: Akihiko Izumi, Tokyo (JP); Nobuyuki Tanaka, Tokyo (JP); Masahiro Otsuka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 262 days.

(21) Appl. No.: 18/548,215

(22) PCT Filed: Jan. 13, 2022

(86) PCT No.: PCT/JP2022/000831
§ 371 (c)(1),
(2) Date: Aug. 28, 2023

(87) PCT Pub. No.: WO2022/185724
PCT Pub. Date: Sep. 9, 2022

(65) Prior Publication Data
US 2024/0305395 A1　　Sep. 12, 2024

(30) Foreign Application Priority Data

Mar. 5, 2021　(JP) ................................. 2021-035450

(51) Int. Cl.
*H04J 3/06*　　　(2006.01)
*H04L 41/0893*　　(2022.01)
(52) U.S. Cl.
CPC ........ *H04J 3/0667* (2013.01); *H04L 41/0893* (2013.01)

(58) Field of Classification Search
CPC .......... H04J 3/06; H04J 3/0635; H04J 3/0638; H04J 3/0658; H04J 3/0667; H04J 3/12; H04L 41/08; H04L 41/0893
See application file for complete search history.

(56) References Cited

U.S. PATENT DOCUMENTS 10,341,972 B2 *　7/2019　Park ...................... H04J 3/0641
2018/0062780 A1 *　3/2018　Shimizu ............... H04N 21/242

FOREIGN PATENT DOCUMENTS

JP　　2018-112425 A　　7/2018
JP　　2019-047457 A　　3/2019

OTHER PUBLICATIONS

Tirado Andrés et al., "A Methodology for Choosing Time Synchronization Strategies for Wireless IoT Networks", Aug. 9, 2019, Sensors 19, No. 16: 3476, https://doi.org/10.3390/s19163476, pp. 1-18 (Year: 2019).*

(Continued)

*Primary Examiner* — Paul H. Masur
(74) *Attorney, Agent, or Firm* — CHIP LAW GROUP

(57)　　　　　ABSTRACT

The present technology relates to an information processing apparatus, information processing terminal, delivery method, and time synchronization method that allow each device to easily set an appropriate method for time synchronization. An information processing apparatus according to one aspect of the present technology delivers, according to a request from a client device, information representing a time synchronization strategy designed as a method for time synchronization between client devices forming the same group. The present technology can be applied to a server connected to a network.

13 Claims, 23 Drawing Sheets

(56) References Cited

OTHER PUBLICATIONS

Machine Translatio of JP-2019047457-A (Year: 2019).*

Swain et al., "A model for the classification and survey of clock synchronization protocols in WSNs", Dec. 4, 2014, Ad Hoc Networks 27 (2015) 219-241, http://dx.doi.org/10.1016/j.adhoc.2014.11.021, pp. 1-23 (Year: 2014).*

Jia et al., "Distributed Clock Synchronization Based on Intelligent Clustering in Local Area Industrial IoT Systems", Aug. 26, 2019, IEEE Transactions on Industrial Informatics (vol. 16, Issue: 6, Jun. 2020), pp. 3697-3707, DOI: 10.1109/TII.2019.2937331 (Year: 2019).*

International Search Report and Written Opinion of PCT Application No. PCT/JP2022/000831, issued on Apr. 19, 2022, 09 pages of ISRWO.

* cited by examiner

Fig. 2

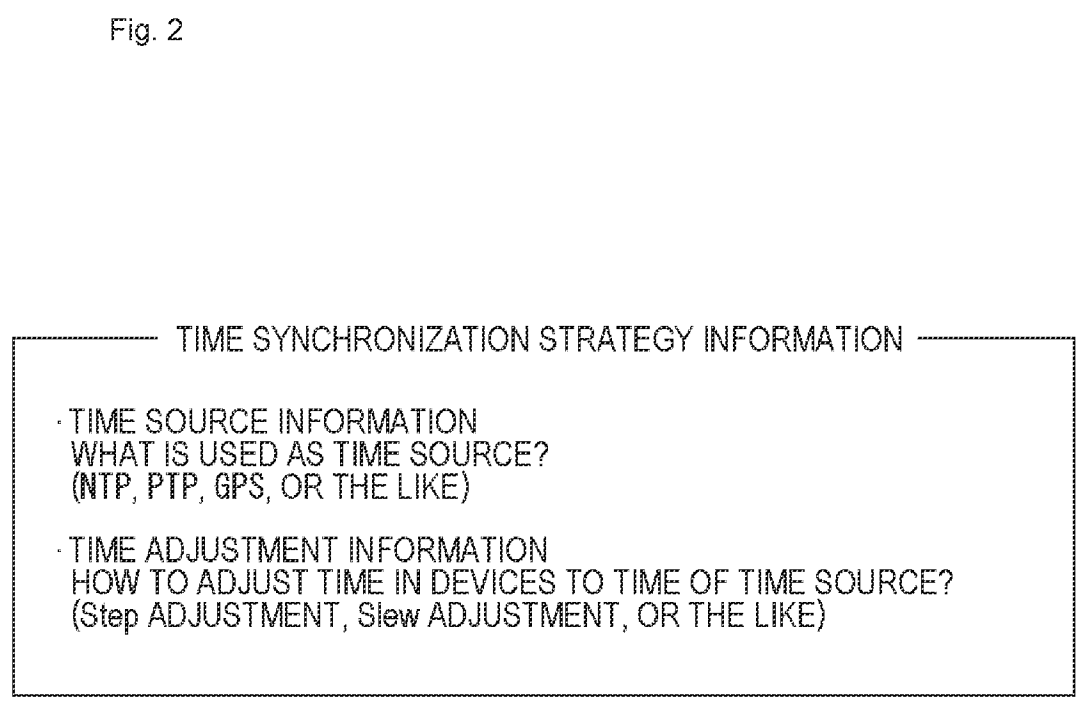

———— TIME SYNCHRONIZATION STRATEGY INFORMATION ————

· TIME SOURCE INFORMATION
WHAT IS USED AS TIME SOURCE?
(NTP, PTP, GPS, OR THE LIKE)

· TIME ADJUSTMENT INFORMATION
HOW TO ADJUST TIME IN DEVICES TO TIME OF TIME SOURCE?
(Step ADJUSTMENT, Slew ADJUSTMENT, OR THE LIKE)

Fig. 17

DELAY TIME MATRIX

|  | TIME SOURCE 1 | TIME SOURCE 2 | TIME SOURCE 3 | TIME SOURCE 4 |
|---|---|---|---|---|
| CLIENT A | 2 | 8 | × | 50 |
| CLIENT B | 2 | 7 | × | 50 |
| CLIENT C | 7 | 3 | × | 51 |
| CLIENT D | × | × | 3 | 43 |
| CLIENT E | × | × | 3 | 44 |

INFORMATION PROCESSING APPARATUS, INFORMATION PROCESSING TERMINAL, DELIVERY METHOD, AND TIME SYNCHRONIZATION METHOD

CROSS REFERENCE TO RELATED APPLICATIONS

This application is a U.S. National Phase of International Patent Application No. PCT/JP2022/000831 filed on Jan. 13, 2022, which claims priority benefit of Japanese Patent Application No. JP 2021-035450 filed in the Japan Patent Office on Mar. 5, 2021. Each of the above-referenced applications is hereby incorporated herein by reference in its entirety.

TECHNICAL FIELD

The present technology relates to an information processing apparatus, an information processing terminal, a delivery method, and a time synchronization method, and more particularly, to an information processing apparatus, an information processing terminal, a delivery method, and a time synchronization method that allow each device to easily set an appropriate method for time synchronization.

BACKGROUND ART

There is an application that captures an image of a state in a space with a plurality of cameras installed in a specific space, such as a store, and recognizes, for example, an action of a person in the space. Because, in a system that implements such an application, images captured at the same time are used for recognition for each time, settings for synchronizing time of the respective cameras are required.

Technical skills are required to appropriately perform settings for synchronizing time of a plurality of devices.

CITATION LIST

Patent Document

Patent Document 1: Japanese Patent Application Laid-Open No. 2018-112425

SUMMARY OF THE INVENTION

Problems to be Solved by the Invention

Because technical skills are required, it is difficult for general users to appropriately perform the settings for synchronizing time. It is costly to have a person with expertise perform the settings.

Furthermore, because a setting for synchronizing time is performed for each device, a setting for a certain device may not be optimal when an entire device group is taken into consideration.

As described above, in a case where recognition is performed for each time on the basis of the images captured at the same time, recognition accuracy may decrease due to poor accuracy of time synchronization.

The present technology has been made in view of such a situation, and allows each device to easily set an appropriate time synchronization method.

Solutions to Problems

An information processing apparatus according to one aspect of the present technology includes a delivery unit that delivers, according to a request from a client device, information representing a time synchronization strategy designed as a method for time synchronization between client devices forming the same group.

An information processing terminal according to another aspect of the present technology includes a time synchronization strategy acquisition unit that requests, from an information processing apparatus that manages a time synchronization strategy designed as a method for time synchronization between client devices forming the same group, the time synchronization strategy, and receives information representing the time synchronization strategy delivered corresponding to the request, and a time synchronization unit that synchronizes, according to the time synchronization strategy, time between the client devices forming same the group.

In one aspect of the present technology, according to a request from a client device, information is delivered, the information representing a time synchronization strategy designed as a method for time synchronization between client devices forming the same group.

In another aspect of the present technology, there is requested, from an information processing apparatus that manages a time synchronization strategy designed as a method for time synchronization between client devices forming the same group, the time synchronization strategy, and there is received information representing the time synchronization strategy delivered corresponding to the request. Furthermore, according to a time synchronization strategy, time is synchronized between client devices forming the same group.

BRIEF DESCRIPTION OF DRAWINGS

FIG. 2 is a diagram illustrating an example of time synchronization strategy information.

FIG. 17 is a diagram illustrating an example of a delay time matrix.

MODE FOR CARRYING OUT THE INVENTION

Overview of Present Technology

In the present technology, in a case where it is necessary to synchronize time between a plurality of client devices, information of a time synchronization strategy is delivered from a server to each of the client devices, and each of the client devices is caused to set a method for time synchronization according to content of time synchronization strategy.

An optimal time synchronization strategy is set for each of client devices forming a predetermined group, such as each of client devices of the same type, each of client devices for the same use, and each of client devices connected to the same network.

Time synchronization strategies are designed in advance by, for example, an administrator of the server that delivers time synchronization strategies. An optimal time synchronization strategy is selected from among a plurality of types of designed time synchronization strategies, and is delivered to each client device. For example, there is designed a time synchronization strategy that indicates, for example, from which time source time information is obtained to be used to set time in the client devices, or how the time is adjusted.

With this arrangement, an appropriate method for time synchronization can be automatically set for each client device.

Hereinafter, a mode for carrying out the present technology is described. The description will be given in the following order.

1. Time synchronization in information processing system
2. Application example of time synchronization
3. Configuration and operation of time synchronization strategy server
4. Configuration of client device
5. Others

Time Synchronization in Information Processing System

Configuration of Information Processing System

Figure 1:
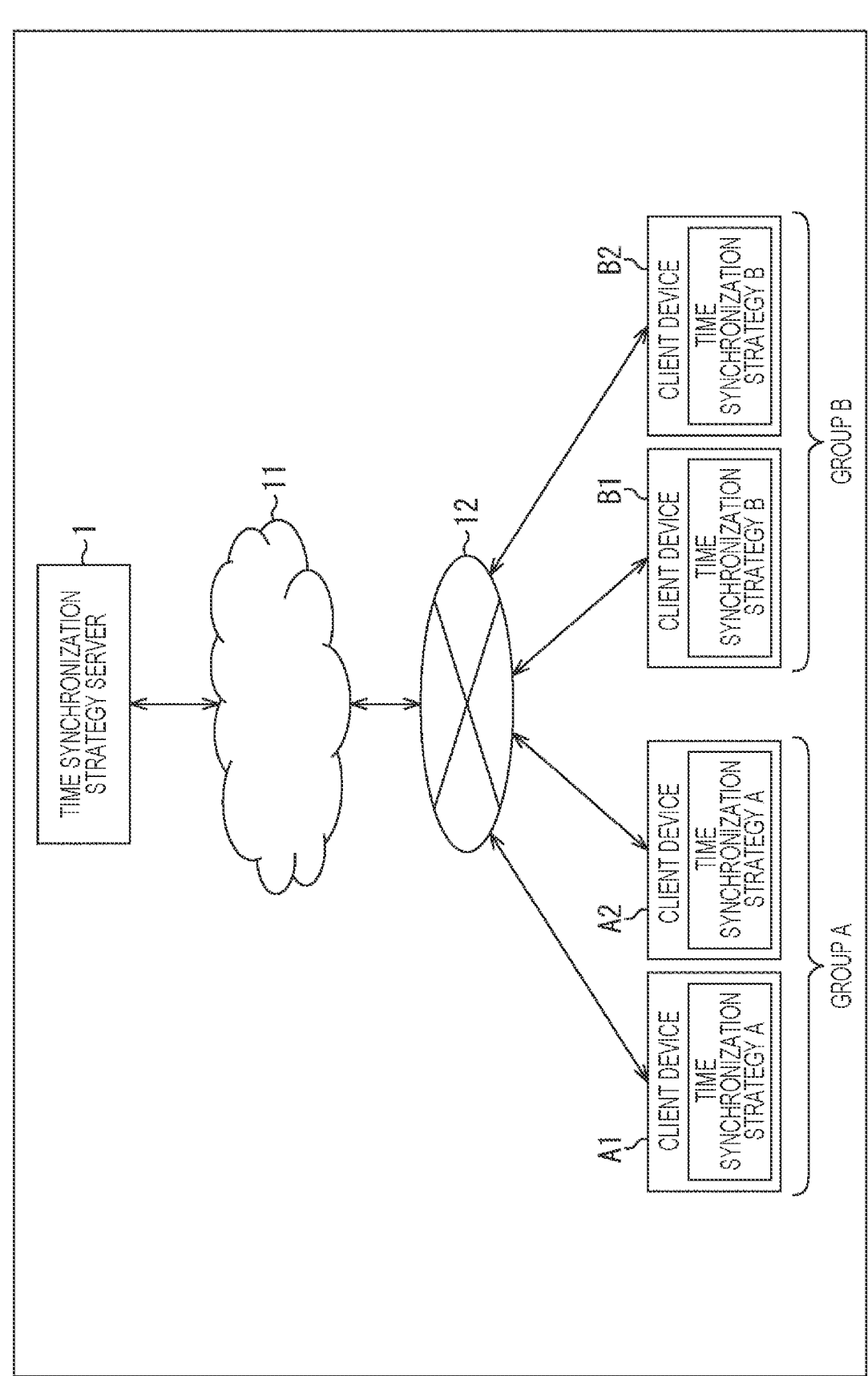
FIG. 1 is a diagram illustrating an example of a configuration of an information processing system according to an embodiment of the present technology.

FIG. 1 is a diagram illustrating an example of a configuration of an information processing system according to an embodiment of the present technology.

The information processing system in FIG. 1 is configured by a plurality of client devices being connected to a time synchronization strategy server 1 via a network 11 such as the Internet. In the example in FIG. 1, four client devices, client devices A1 and A2 and client devices B1 and B2, are illustrated.

For example, the client devices A1 and A2 and the client devices B1 and B2 are connected to a network 12, which is a network such as a LAN provided in a predetermined space such as a store. Each of the client devices A1 and A2 and the client devices B1 and B2 is connected to the network 12 via the network 11. Various network devices such as a dynamic host configuration protocol (DHCP) server and a Hub are connected to the network 12.

The client devices A1 and A2 are client devices of a group A, and the client devices B1 and B2 are client devices of a group B. For example, a group of client devices is formed for each type of or each use of the client devices.

Various devices serving as time sources are connected to the network 11 and the network 12. According to a predetermined protocol, a device serving as a time source transmits time information to a client device requiring time synchronization.

The time synchronization strategy server 1 is an information processing apparatus that manages a time synchronization strategy for each client device. The time synchronization strategy server 1 delivers (transmits), to each client device that is an information processing terminal, time synchronization strategy information that is information about a time synchronization strategy, and sets a method for time synchronization according to the time synchronization strategy.

FIG. 2 is a diagram illustrating an example of time synchronization strategy information.

As illustrated in FIG. 2, the time synchronization strategy information includes time source information and time adjustment information.

The time source information is information specifying what is used as the time source. Using a network time protocol (NTP) server, a precision time protocol grand master (PTP GM), or a global positioning system (GPS) as a time source, for example, is specified by the time source information. For example, in a case where the NTP server is used as the time source, time in the client devices is adjusted on the basis of time information acquired from the NTP server.

The time adjustment information is information specifying how to adjust the time in the client devices to the time of the time source (a behavior of time adjustment). The behavior of time adjustment includes Step adjustment, Slew adjustment, and the like. The Step adjustment is a method for adjusting time immediately, by skipping if necessary. The Slew adjustment is a method for gradually adjusting time while changing an advancing pace of the time, avoiding skipping. A selective use of the Step adjustment and the Slew adjustment, or the like is also specified by the time adjustment information.

Each of the client devices synchronizes time with another client device in the same group according to content of the time synchronization strategy information including such information.

In the example in FIG. 1, the client devices A1 and A2, which are client devices of the group A, synchronize time according to a time synchronization strategy A. The client devices A1 and A2 synchronize the time using the same behavior on the basis of time information acquired from the same time source.

Furthermore, the client devices B1 and B2, which are client devices of the group B, synchronize time according to a time synchronization strategy B. The client devices B1 and B2 synchronize the time using the same behavior on the basis of time information acquired from the same time source. The time synchronization strategy A and the time synchronization strategy B are time synchronization strategies of which, for example, types of time sources and behaviors of time adjustment are different.

Thus, the time synchronization strategy server 1 can set the same time synchronization strategy for the client devices in the same group.

Furthermore, the time synchronization strategy server 1 can set different time synchronization strategies for client devices in different groups. The time synchronization strategy server 1 can set different time synchronization strategies for client devices connected to the same network (network 12), if the client devices belong to different groups.

<Setting of Time Synchronization Strategy>

Figure 3:
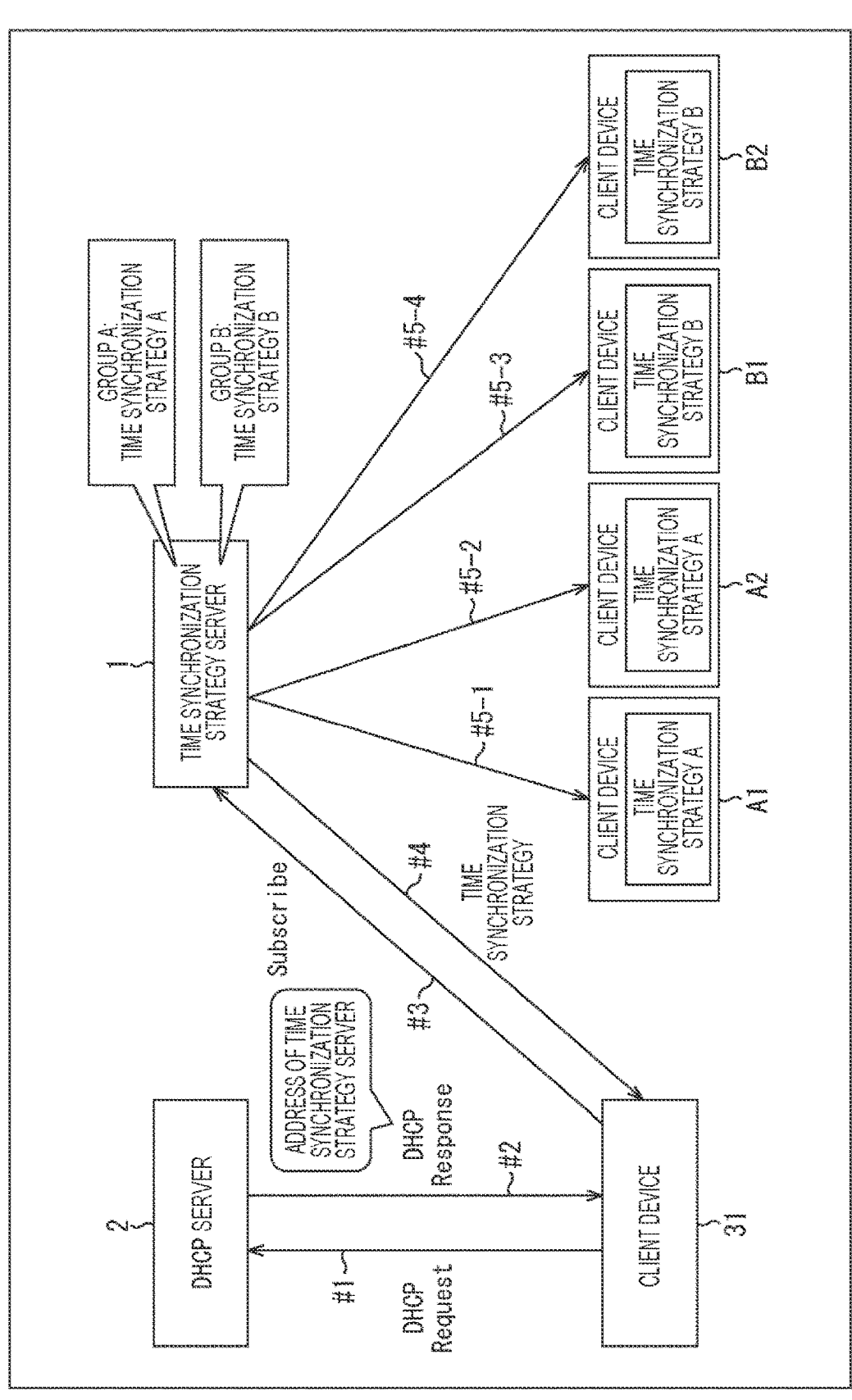
FIG. 3 is a diagram illustrating a flow of setting a time synchronization strategy.

FIG. 3 is a diagram illustrating a flow of setting a time synchronization strategy.

In FIG. 3, illustration of the network 11 and the like is omitted. The client devices A1 and A2 are client devices for which the time synchronization strategy A is set by the time synchronization strategy server 1 as described above. The client devices B1 and B2 are client devices for which the time synchronization strategy B is set.

The DHCP server 2 is, for example, a server on the network 12. The DHCP server 2 assigns an IP address to client devices, such as the client devices A1 and A2 and the client devices B1 and B2, connected to the network 12.

In a case where a client device 31 is added as a client device on the network 12 in such a state, the client device 31 transmits a DHCP Request to the DHCP server 2 as indicated by an arrow #1.

In response to the transmission of the DHCP Request, the DHCP server 2 transmits a DHCP Response to the client device 31 as indicated by an arrow #2. The DHCP Response includes an IP address assigned to the client device 31 and an address of the time synchronization strategy server 1.

The client device 31 accesses the time synchronization strategy server 1 on the basis of the address notified by the DHCP Response, and transmits a Subscribe as indicated by an arrow #3. The Subscribe is information representing a request for registration of a client device.

The time synchronization strategy server 1 transmits time synchronization strategy information to the registered client device 31 as indicated by an arrow #4.

Upon receiving the time synchronization strategy information transmitted from the time synchronization strategy server 1, the client device 31 sets internal time according to a time synchronization strategy and synchronizes the time with another client device in the same group.

In a case where a change has occurred in the set time synchronization strategy in response to the addition of the client device 31, the time synchronization strategy server 1 appropriately Push-delivers an updated time synchronization strategy to each of the client devices A1 and A2 and the client devices B1 and B2 as indicated by arrows #5-1 to #5-4. Thus, the time synchronization strategy set by the time synchronization strategy server 1 is dynamically changed according to a change in environment, or the like.

A series of processing at a time of delivery of a time synchronization strategy will be described with reference to the flowcharts in FIGS. 4 and 5.

Figure 4:
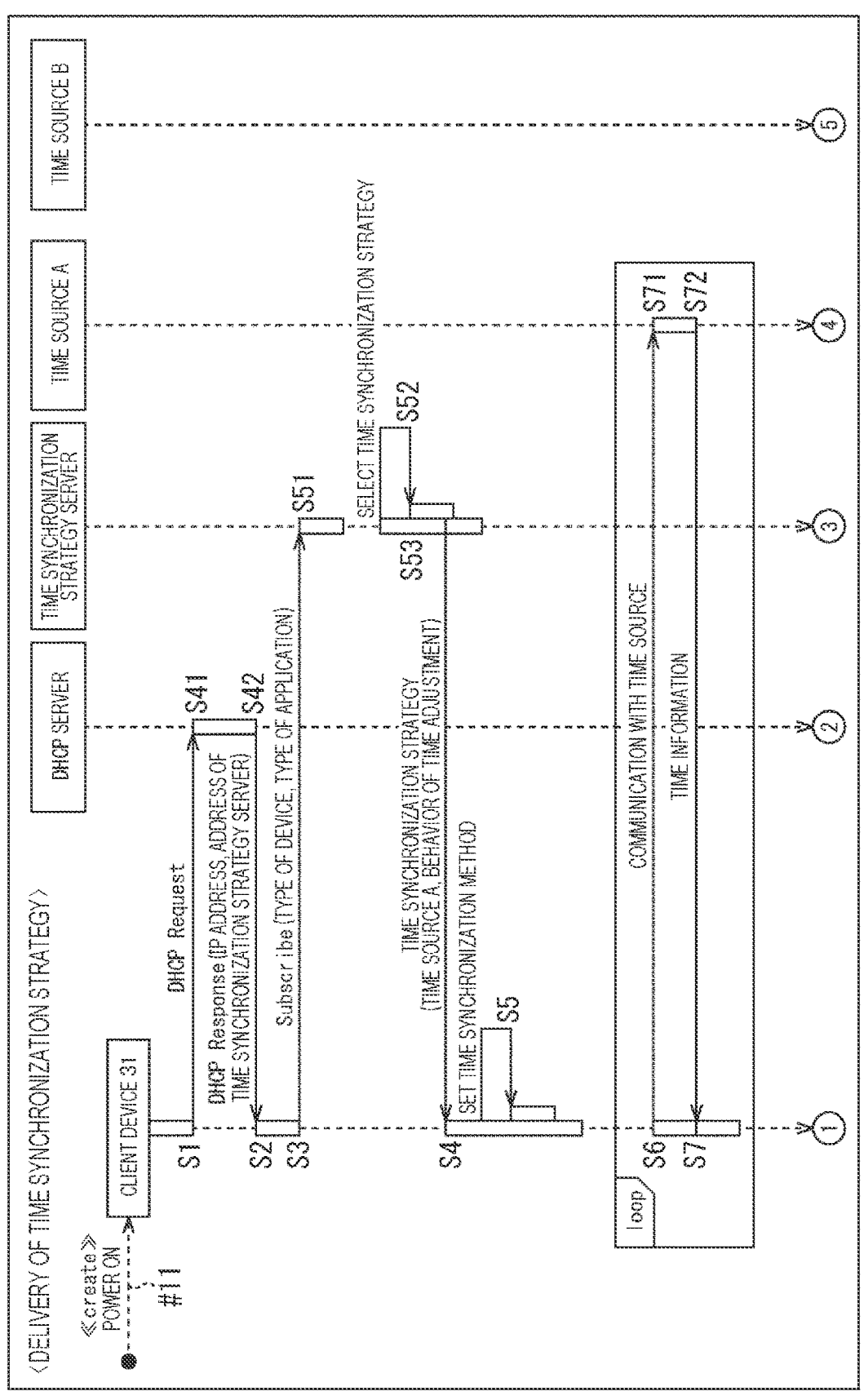
FIG. 4 is a flowchart illustrating a series of processing at a time of delivery of a time synchronization strategy.

As indicated by a dashed arrow #11, the processing illustrated in FIG. 4 is started, for example, when the client device 31 is powered on and connected to the network 12.

In Step S1, the client device 31 transmits the DHCP Request to the DHCP server 2.

In Step S41, the DHCP server 2 receives the DHCP Request transmitted from the client device 31.

In Step S42, the DHCP server 2 transmits the DHCP Response to the client device 31. The DHCP Response includes the IP address assigned to the client device 31 and the address of the time synchronization strategy server 1.

In Step S2, the client device 31 receives the DHCP Response transmitted from the DHCP server 2.

In Step S3, the client device 31 transmits the Subscribe to the time synchronization strategy server 1. The Subscribe includes device information representing a type of a device of the client device 31, a type of an application of the client device 31, and the like. For example, a use of the client device 31 is identified by the type of application.

In Step S51, the time synchronization strategy server 1 receives the Subscribe transmitted from the client device 31.

In Step S52, the time synchronization strategy server 1 selects a time synchronization strategy according to the Subscribe. In the example in FIG. 4, a time source A, of the time source A and time source B, is used as the time source, and a time synchronization strategy using a predetermined behavior of time adjustment is selected.

In Step S53, the time synchronization strategy server 1 transmits the time synchronization strategy information to the client device 31.

In Step S4, the client device 31 receives the time synchronization strategy information transmitted from the time synchronization strategy server 1.

In Step S5, the client device 31 sets the method for the time synchronization according to the time synchronization strategy.

In Step S6, the client device 31 communicates with a device serving as the time source A, and, in Step S7, receives the time information transmitted from the device serving as the time source A.

The device serving as the time source A communicates with the client device 31 in Step S71, and transmits the time information to the client device 31 in Step S72.

By the processing in Steps S6, S7, S71, and S72 being repeated, time synchronization is performed in the client device 31.

Processing similar to the above processing is performed every time a client device is added.

Figure 5:
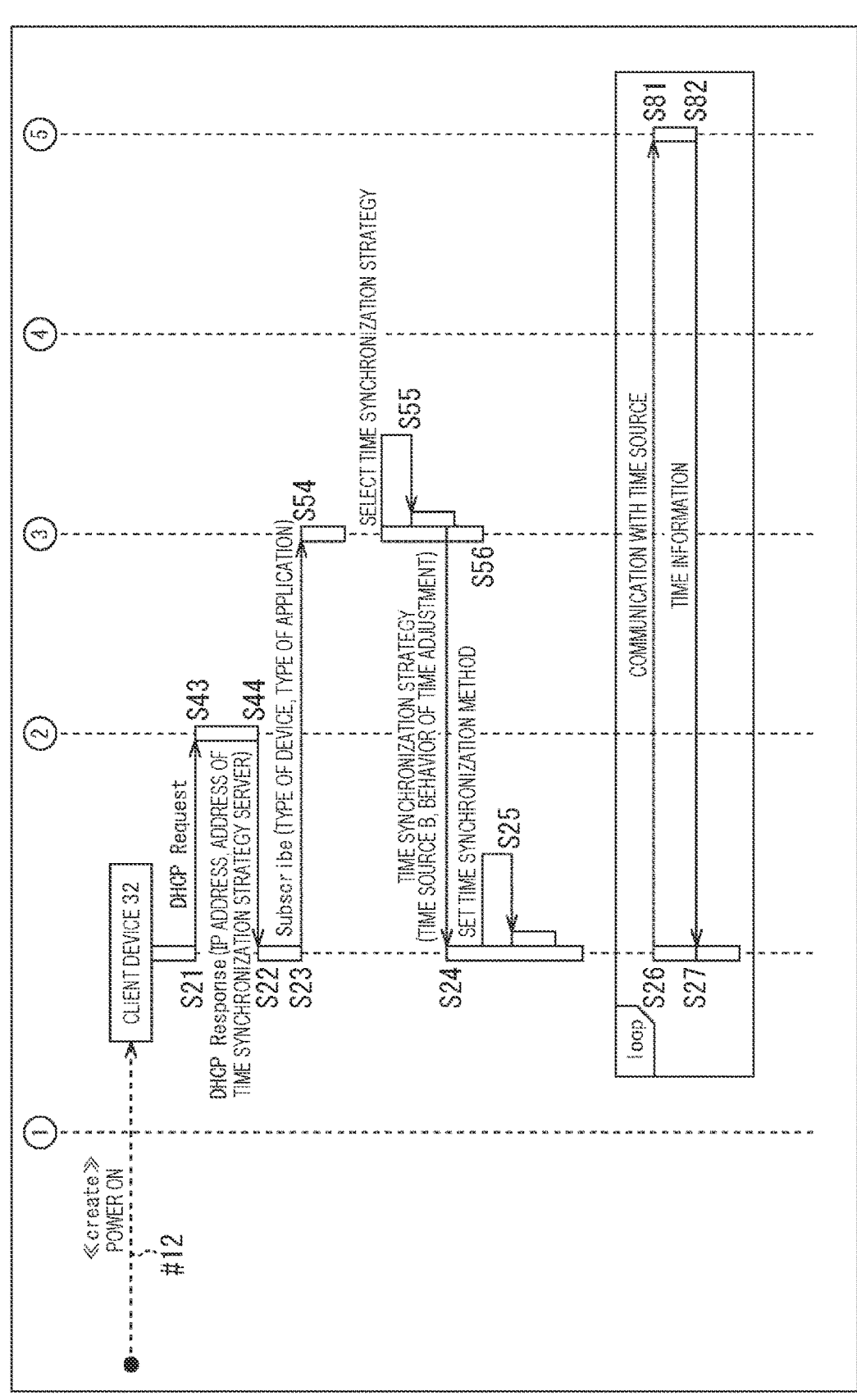
FIG. 5 is a flowchart following FIG. 4 illustrating a series of processing at a time of delivery of a time synchronization strategy.

As indicated by a dashed arrow #12 in FIG. 5, processing performed in Steps S21 to S27 by a client device 32 in a case where the client device 32 is connected to the network 12 is similar to the processing in Steps S1 to S7.

Furthermore, the processing in Steps S43 and S44 performed by the DHCP server 2 is similar to the processing in Steps S41 and S42. The processing in Steps S54 to S56 performed by the time synchronization strategy server 1 is similar to the processing in Steps S51 to S53. Redundant description will be omitted as appropriate.

In the example in FIG. 5, the time source B, of the time source A and time source B, is used as the time source, and a time synchronization strategy using a predetermined behavior of time adjustment is selected as a time synchronization strategy for the client device 32. Time synchronization strategy information representing such a time synchronization strategy is transmitted to the client device 32 in Step S56.

In Step S24, the client device 32 receives the time synchronization strategy information transmitted from the time synchronization strategy server 1.

In Step S25, the client device 32 sets the method for the time synchronization according to the time synchronization strategy.

In Step S26, the client device 32 communicates with a device serving as the time source B, and, in Step S27, receives the time information transmitted from the device serving as the time source B.

The device serving as the time source B communicates with the client device 32 in Step S81, and transmits the time information to the client device 32 in Step S82.

By the processing in Steps S26, S27, S81, and S82 being repeated, time synchronization is performed in the client device 32.

A series of processing at a time of a dynamic change in a time synchronization strategy will be described with reference to the flowcharts in FIGS. 6 and 7.

Figure 6:
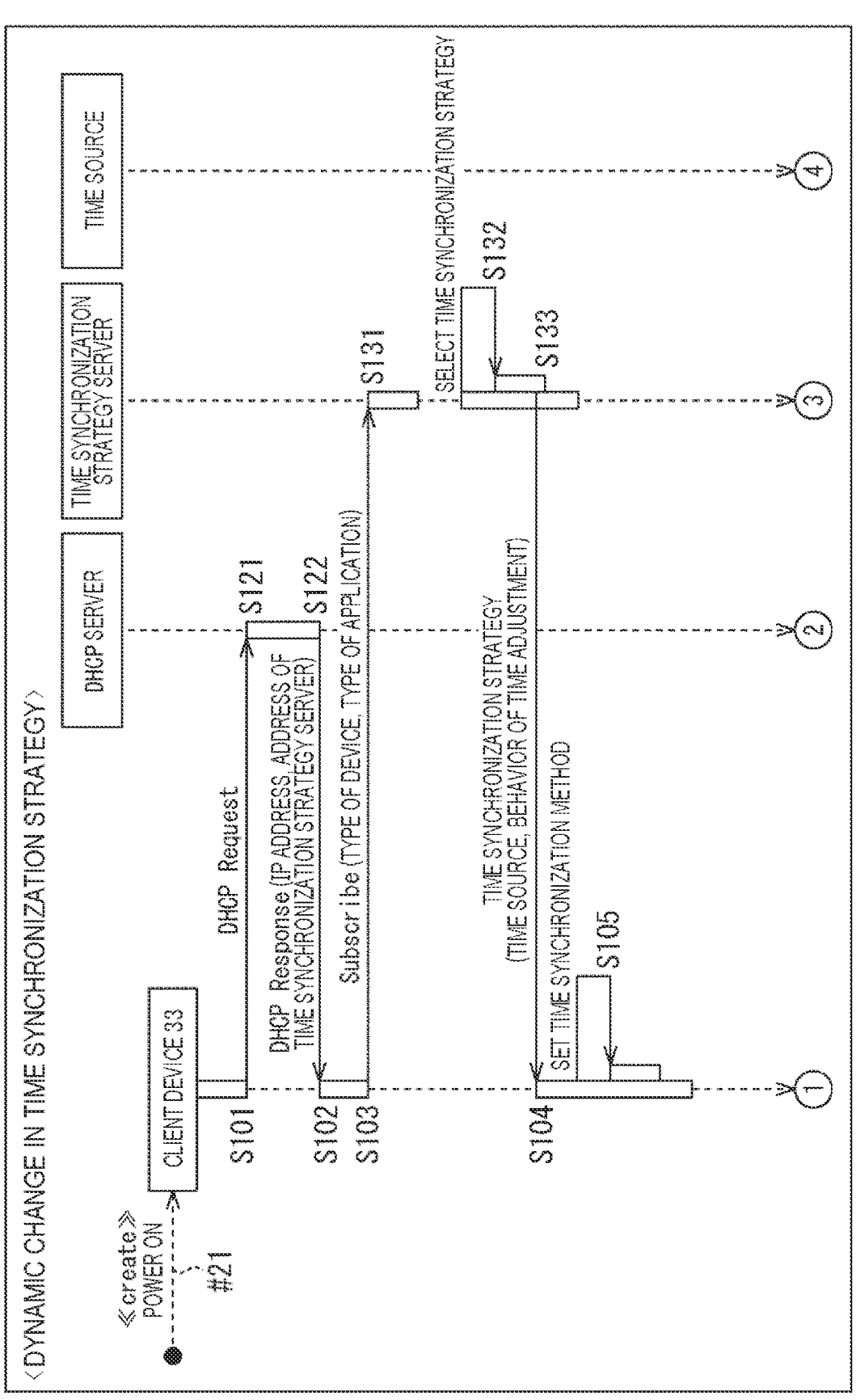
FIG. 6 is a flowchart illustrating a series of processing at a time of a dynamic change in a time synchronization strategy.

As indicated by a dashed arrow #21 in FIG. 6, processing in Steps S101 to S107 performed by a client device 33 in a case where the client device 33 is connected to the network 12 is similar to the processing in Steps S1 to S7.

Furthermore, the processing in Steps S121 and S122 performed by the DHCP server 2 is similar to the processing in Steps S41 and S42. The processing in Steps S131 to S133 performed by the time synchronization strategy server 1 is similar to the processing in Steps S51 to S53. Redundant description will be omitted as appropriate.

In the example in FIG. 6, a predetermined time source is used as the time source, and a time synchronization strategy using a predetermined behavior of time adjustment is selected as a time synchronization strategy for the client device 33. Time synchronization strategy information representing such a time synchronization strategy is transmitted to the client device 33 in Step S133.

In Step S104, the client device 33 receives the time synchronization strategy information transmitted from the time synchronization strategy server 1.

In Step S105, the client device 33 sets the method for the time synchronization according to the time synchronization strategy.

Figure 7:
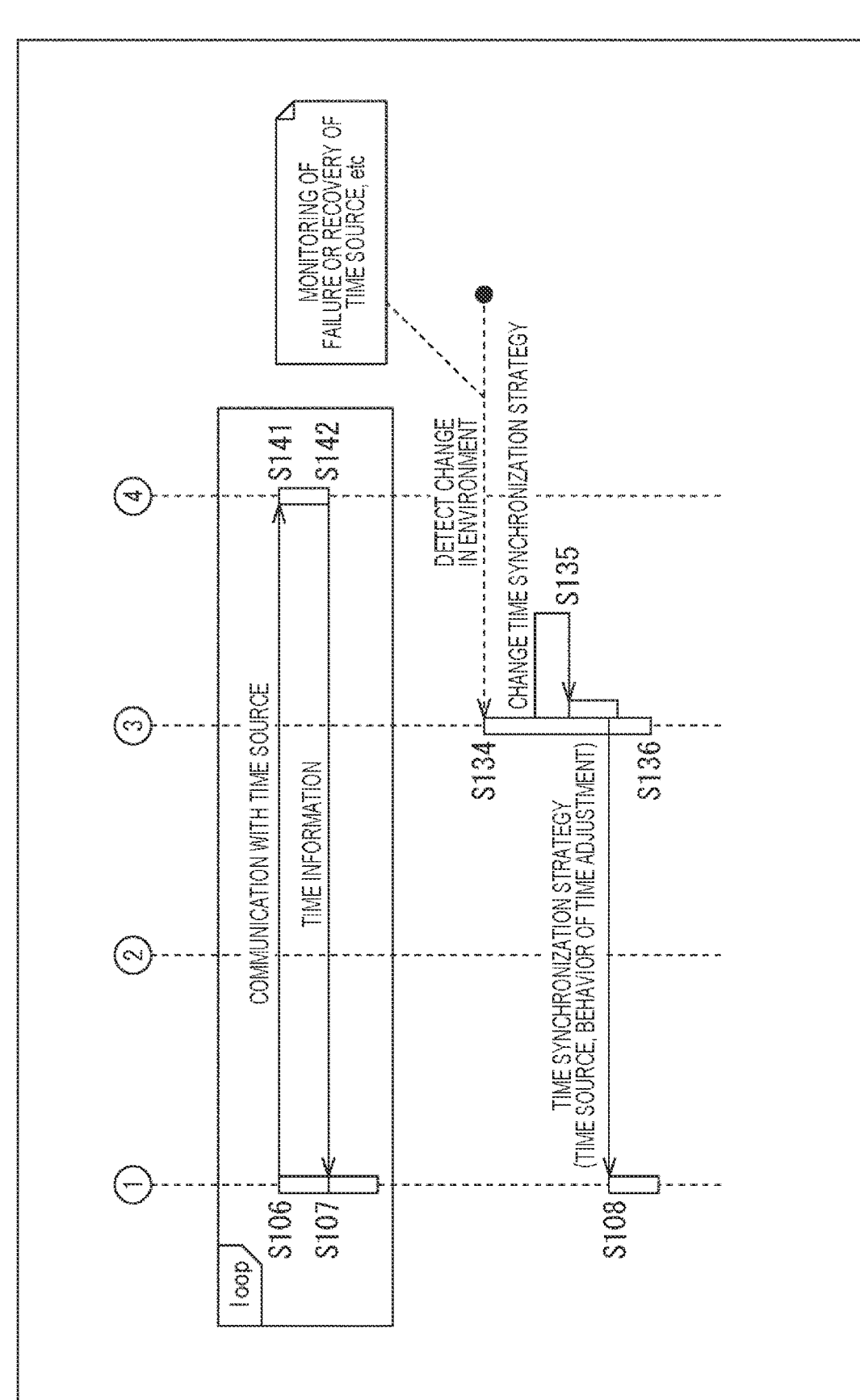
FIG. 7 is a flowchart following FIG. 6 illustrating a series of processing at a time of a dynamic change in a time synchronization strategy.

In Step S106 in FIG. 7, the client device 33 communicates with a device serving as the time source, and, in Step S107, receives the time information transmitted from the device serving as the time source.

The device serving as the time source communicates with the client device 33 in Step S141, and transmits the time information to the client device 33 in Step S142.

By the processing in Steps S106, S107, S141, and S142 being repeated, time synchronization is performed in the client device 33.

In the time synchronization strategy server 1, monitoring of environment, such as a failure of a time source or recovery of the time source, is continuously performed.

In a case where a change occurs in the environment due to a failure of the time source, or the like, the time synchronization strategy server 1 detects the change in Step S134.

In Step S135, the time synchronization strategy server 1 updates (changes) the time synchronization strategy according to the change in environment.

In Step S136, the time synchronization strategy server 1 transmits, to the client device 33, time synchronization strategy information representing the updated time synchronization strategy.

In Step S108, the client device 33 receives the time synchronization strategy information transmitted from the time synchronization strategy server 1. The client device 33 performs processing similar to the above-described processing such as resetting the method for time synchronization, and synchronizes the time according to the updated time synchronization strategy.

As described above, in the information processing system in FIG. 1, a time synchronization strategy for each client device forming the same group is set by the time synchronization strategy server 1.

An administrator of the time synchronization strategy server 1 can set an optimal time synchronization strategy for each client device by setting, in the time synchronization strategy server 1, a time synchronization strategy designed by using his/her own know-how. Furthermore, the administrator of the time synchronization strategy server 1 can change a setting of the time synchronization strategy as appropriate.

The group is formed not according to a type of the client devices, but is formed as appropriate according to use of the client devices, such as a type of an application implemented by the client devices or a type of service provided by the client devices. In this case, the same time synchronization strategy is set for the client devices for the same use.

Furthermore, the time synchronization strategy is delivered according to the Subscribe from the client device, by which the change in the time synchronization strategy can be dynamically reflected in each client device.

Application Examples of Time Synchronization

Application Example 1: Example of Application to Mixed Environment of Sensing Camera and Robot FIG. 8 is a diagram illustrating an example in which time synchronization in the information processing system is applied to a mixed environment of a sensing camera and a robot.

Figure 8:
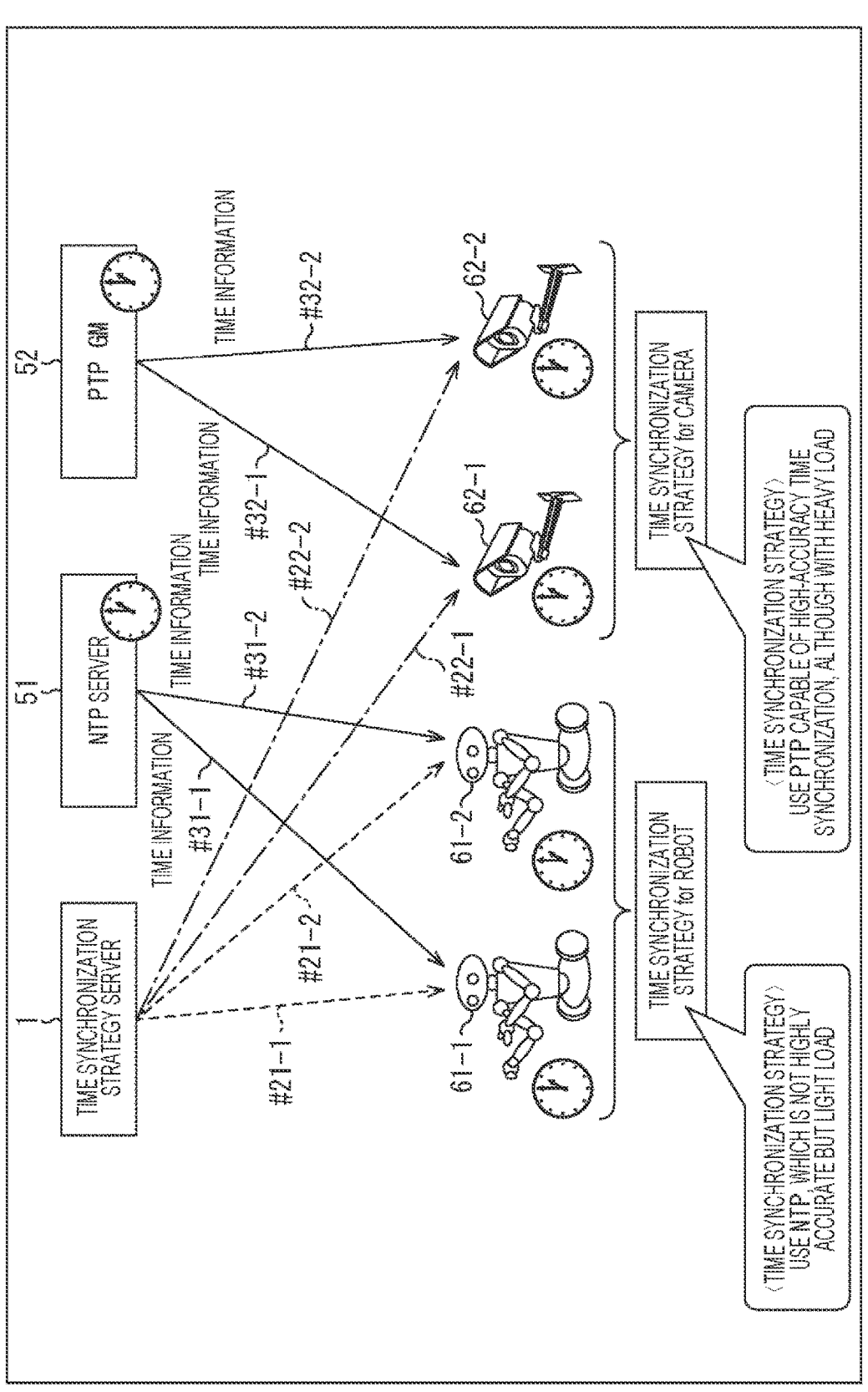
FIG. 8 is a diagram illustrating Application Example 1 of setting a time synchronization strategy.

In the example in FIG. 8, an NTP server 51 and a PTP GM 52 are illustrated as devices serving as time sources.

Furthermore, in the example in FIG. 8, robots 61-1 and 61-2 and sensing cameras 62-1 and 62-2 are illustrated as client devices that require a time synchronization strategy. The robots 61-1 and 61-2 and the sensing cameras 62-1 and 62-2 are each connected to the time synchronization strategy server 1, the NTP server 51, and the PTP GM 52 via the network 11, the network 12, and the like. In a case of the above-described example, the robots 61-1 and 61-2 correspond to the client devices A1 and A2, and the sensing cameras 62-1 and 62-2 correspond to the client devices B1 and B2.

As indicated by dashed arrows #21-1 and #21-2, for the robots 61-1 and 61-2 that constitute the same group, the time synchronization strategy server 1 sets a time synchronization strategy for robot. The time synchronization strategy for robot is a strategy that uses the NTP server 51, which is not a high-accuracy but light-load time source. A behavior when time is synchronized by using time information of the NTP server 51 is also specified by the time synchronization strategy for robot.

Meanwhile, as indicated by dash-dot arrows #22-1 and #22-2, for the sensing cameras 62-1 and 62-2 that constitute the same group, the time synchronization strategy server 1 sets a time synchronization strategy for sensing camera. The time synchronization strategy for sensing camera is a strategy using the PTP GM 52 capable of high-accuracy time synchronization, although with a heavy load. A behavior when time is synchronized by using time information of the PTP GM 52 is also specified by the time synchronization strategy for sensing camera.

Thus, a time synchronization strategy using the NTP server 51, which can be said to be a strategy with a light processing load and a small amount of communication, is set as a time synchronization strategy of the robots 61-1 and 61-2, for which time synchronization with accuracy in the order of milliseconds is sufficient.

Furthermore, a time synchronization strategy using the PTP GM 52, which can be said to be a strategy suitable for high-accuracy time synchronization, is set as a time synchronization strategy of the sensing cameras 62-1 and 62-2 that require highly accurate time synchronization.

Figure 9:
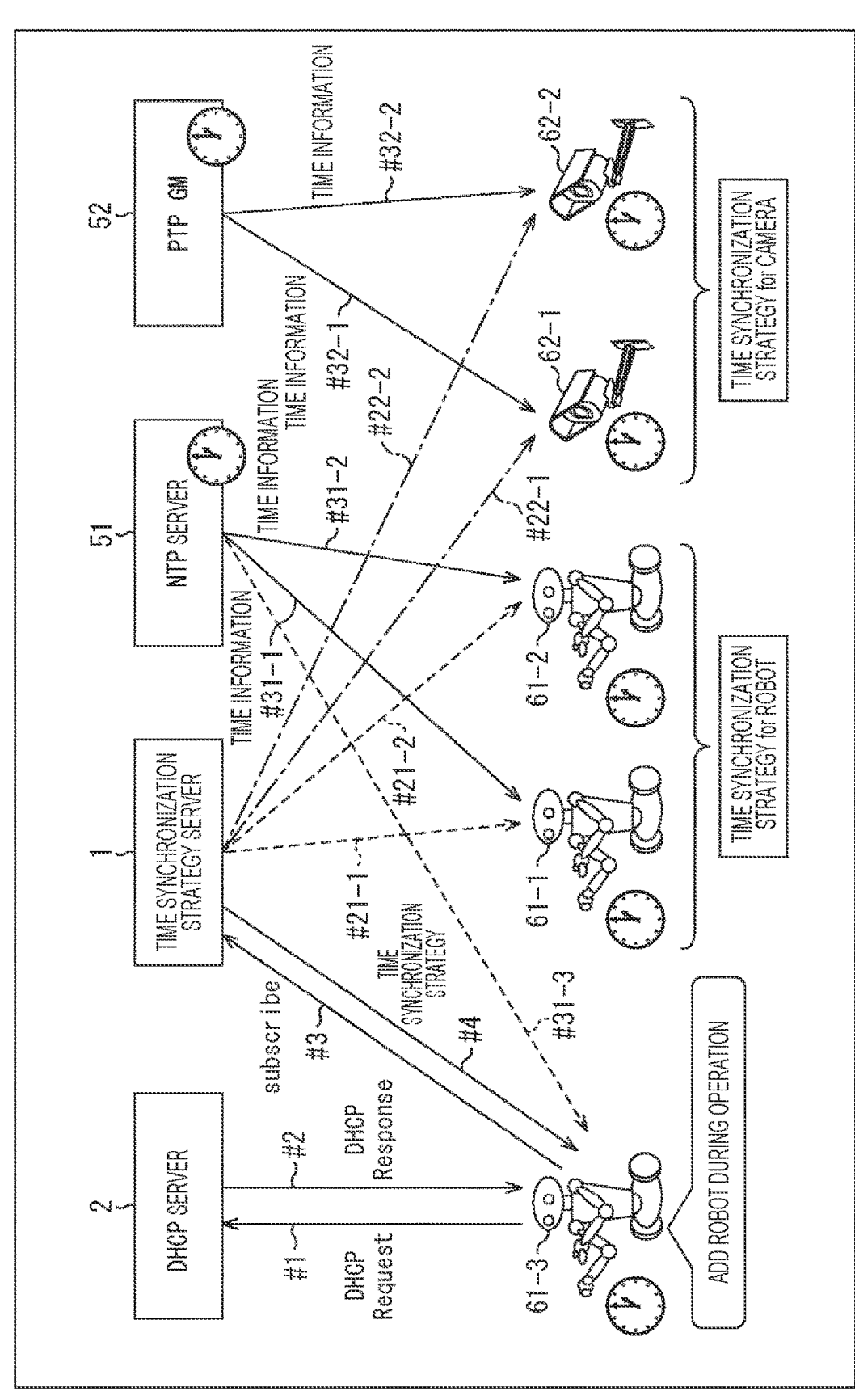
FIG. 9 is a diagram illustrating an example of a case in which a client device is added.

FIG. 9 is a diagram illustrating an example of a case in which a client device is added to the environment illustrated in FIG. 8.

As illustrated on the left side in FIG. 9, in a case where a robot 61-3 is added as a client device on the network 12, the time synchronization strategy server 1 acquires device information transmitted from the robot 61-3 at a time of transmission of a Subscribe indicated by an arrow #3. Processing performed between the robot 61-3 and the DHCP server 2 before the transmission of the Subscribe is similar to processing described with reference to FIG. 3. The robot 61-3 corresponds to the client device 31 in FIG. 3.

On the basis of device information of the robot 61-3, the time synchronization strategy server 1 sets, in the robot 61-3, a time synchronization strategy for robot as indicated by an arrow #4. The time synchronization strategy set in the robot 61-3 is the same as the time synchronization strategies set in the robots 61-1 and 61-2, which are client devices in the same group.

As described above, an administrator of the client device does not need to manually set a method for time synchronization for the added client device. The administrator can set an appropriate time synchronization strategy simply by connecting the client device to a network.

Application Example 2: Example of Application of Intelligent Sensor System

Flow of Time Synchronization

Figure 10:
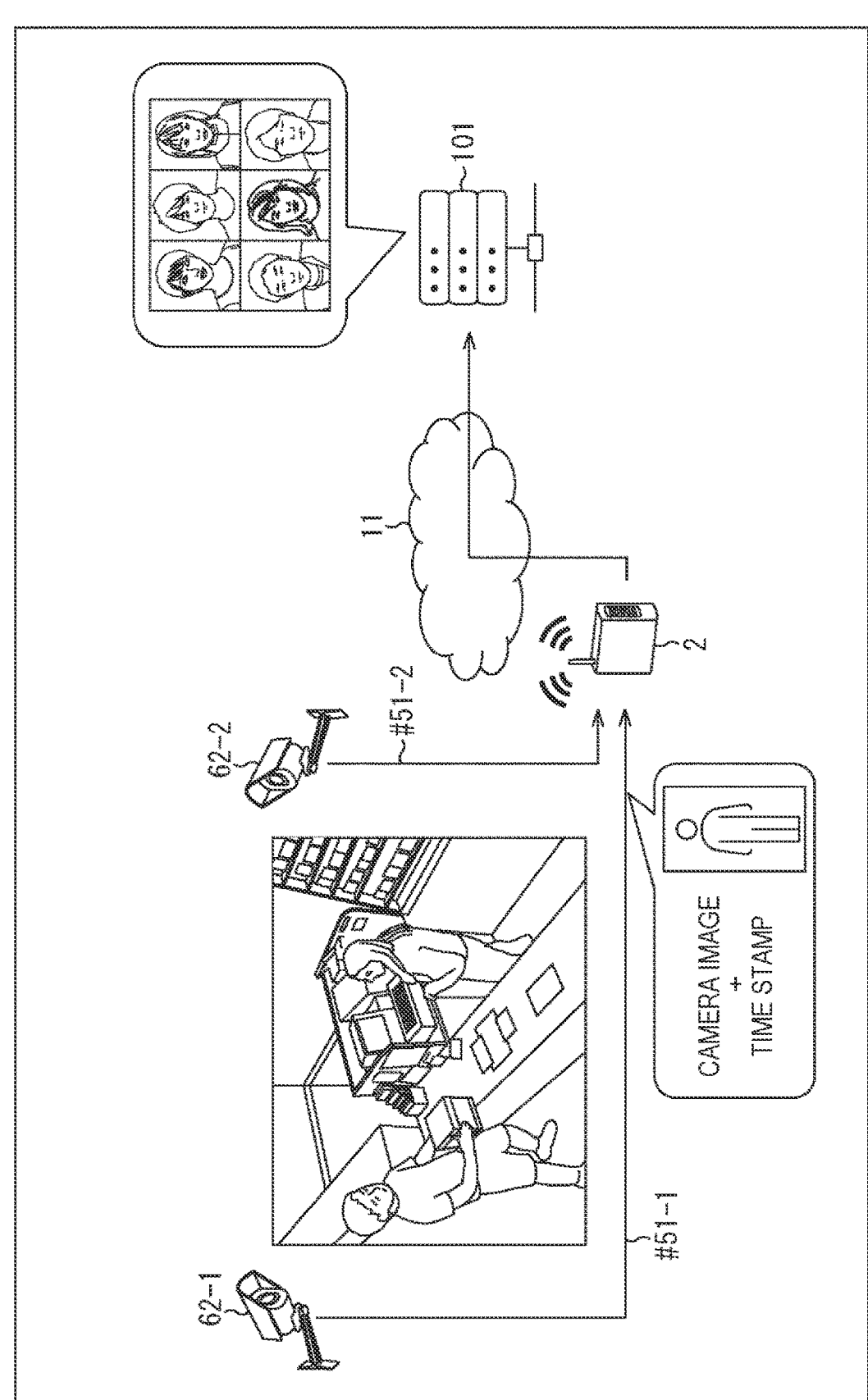
FIG. 10 is a diagram illustrating Application Example 2 of setting a time synchronization strategy.

FIG. 10 is a diagram illustrating an example in which time synchronization in the information processing system is applied to an intelligent sensor system.

For example, the intelligent sensor system illustrated in FIG. 10 is a system for a private business owner. A plurality of sensing cameras (monitoring cameras) is installed in a space such as a store or venue operated by a private business owner. In the example in FIG. 10, the sensing cameras 62-1 and 62-2 are illustrated. For example, an exchange is performed between the sensing cameras 62-1 and 62-2 and the DHCP server 2 by using a DHCP.

The sensing cameras 62-1 and 62-2 acquire a time synchronization strategy from the time synchronization strategy server 1 and synchronize time. In the example in FIG. 10, illustration of the time synchronization strategy server 1 is omitted. A function of the time synchronization strategy server 1 may be provided in a cloud server 101.

Each of the sensing cameras 62-1 and 62-2 captures an image of a state in a space of a store, for example, and transmits a captured image to the cloud server 101 as indicated by arrows #51-1 and #51-2. As indicated by a balloon on the arrow #51-1, a time stamp is added to images transmitted by the sensing cameras 62-1 and 62-2. The time stamp is added on the basis of time managed by each of the sensing cameras 62-1 and 62-2.

Note that a time source used for time synchronization of the sensing cameras 62-1 and 62-2 is a network device having a function of a PTP GM.

The cloud server 101 performs recognition processing such as facial recognition, person tracking, and behavior recognition on the basis of the images transmitted from the sensing cameras 62-1 and 62-2. A result of the recognition processing is used for crime prevention, customer analyses, and the like.

In image processing by the cloud server 101, images to which the same time stamp is added are integrated, and the integrated images are treated as captured images of states of an inside of the store for each time. Therefore, if times of the respective sensing cameras do not match, recognition performance deteriorates in, for example, recognition processing in which images from a plurality of cameras are integrated and used. In particular, highly accurate time synchronization is required in recognition processing on a moving object.

A setting for achieving high-accuracy time synchronization is performed by the time synchronization strategy server 1.

Figure 11:
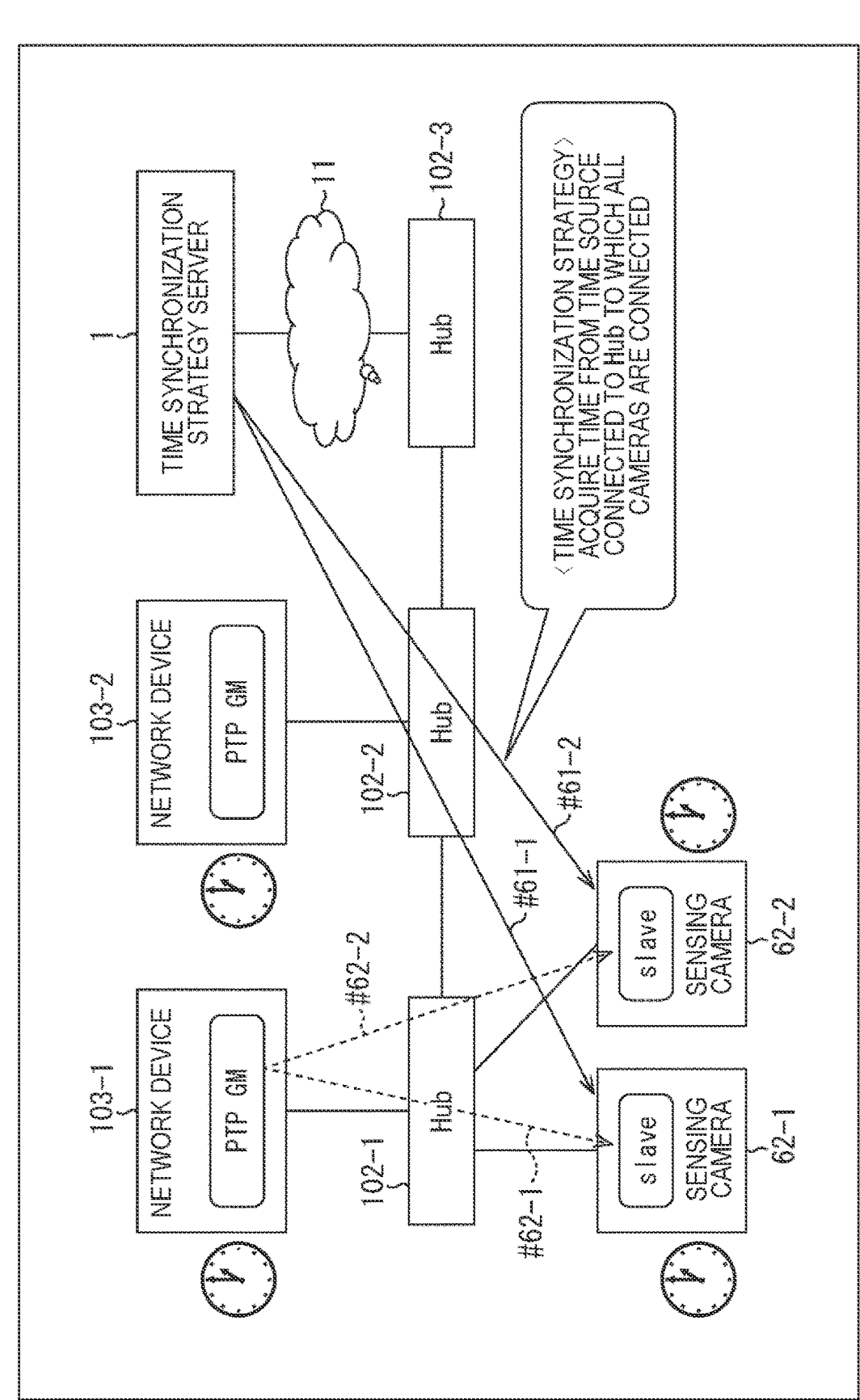
FIG. 11 is a diagram illustrating an example of time synchronization.

FIG. 11 is a diagram illustrating an example of the time synchronization.

In the example in FIG. 11, three Hubs 102-1 to 102-3 are provided in a network to which the sensing cameras 62-1 and 62-2 are connected. The network to which the Hubs 102-1 to 102-3 are connected is, for example, a network in the store. The three Hubs are provided at positions close to the network 11 in an order of the Hub 102-3, the Hub 102-2, and the Hub 102-1.

A network device 103-1 having a function of a PTP GM is connected to the Hub 102-1, and a network device 103-2 having a function of a PTP GM is connected to the Hub 102-2. In this example, two network devices having a function of a PTP GM are provided and connected to the different Hubs.

The sensing cameras 62-1 and 62-2 are connected to the Hub 102-1, to which the network device 103-1 is also connected.

In this state, it is assumed that the sensing cameras 62-1 and 62-2 acquire time information from a device serving as the time source, and synchronize time. If accuracy of the PTP GMs included in the network devices 103-1 and 103-2 is equivalent, it is possible to obtain more accurate time synchronization when the time information is acquired from the network device 103-1, which is the PTP GM closer via the network, than when the time information is acquired from the network device 103-2.

In this case, as indicated by arrows #61-1 and #61-2, the time synchronization strategy server 1 transmits time synchronization strategy information to the sensing cameras 62-1 and 62-2, and synchronizes time on the basis of the time information from the PTP GM included in the network device 103-1.

The sensing cameras 62-1 and 62-2 synchronize the time on the basis of the time information transmitted from the network device 103-1 as indicated by arrows #62-1 and #62-2, respectively.

Case in which Sensing Camera is Added

Figure 12:
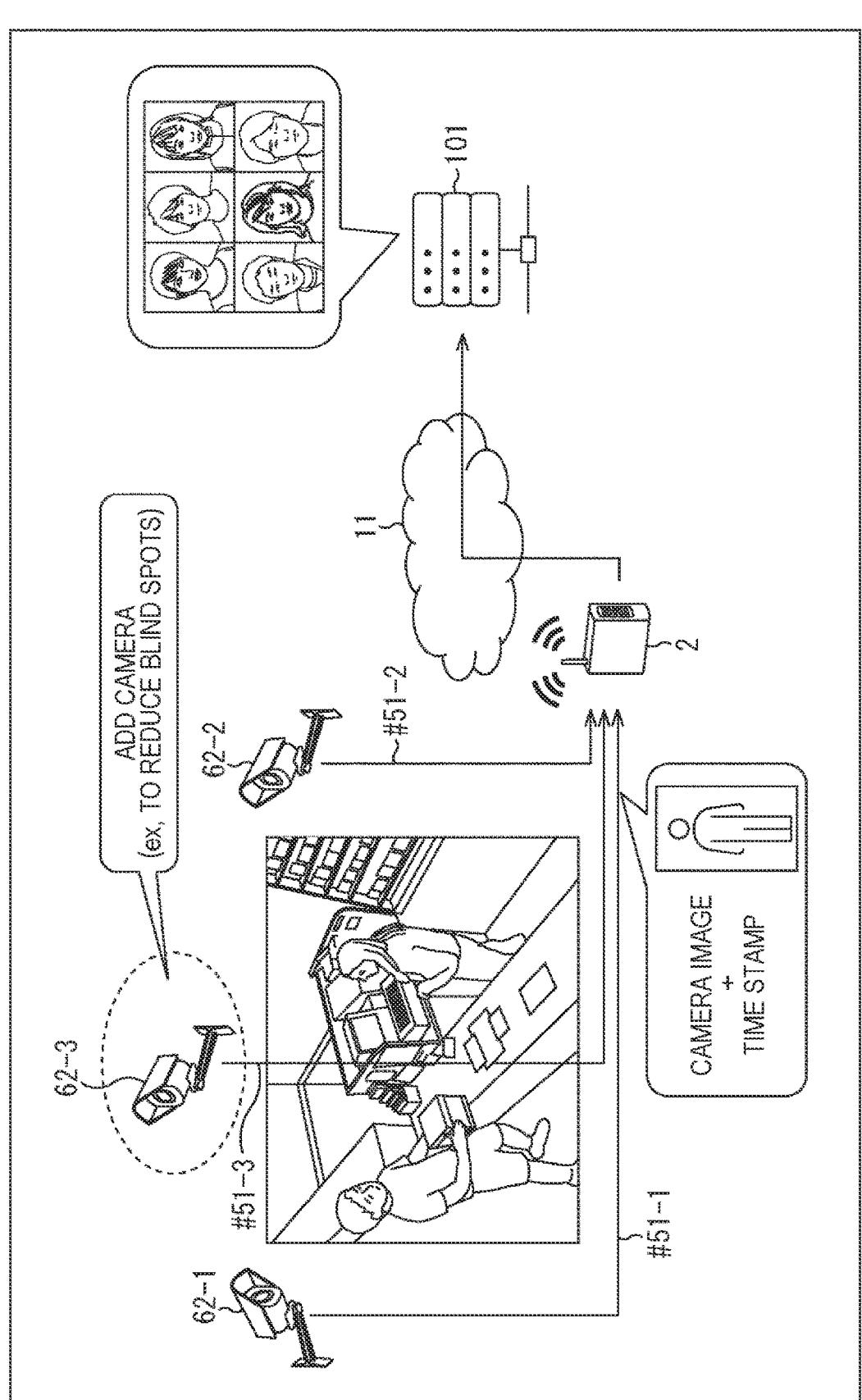
FIG. 12 is a diagram illustrating an example of a case in which a client device is added.

FIG. 12 is a diagram illustrating an example of a case in which a sensing camera is added to the store illustrated in FIG. 10.

In the example in FIG. 12, a sensing camera 62-3, which is one sensing camera, is added as indicated by a dashed circle. A reason for adding a sensing camera is, for example, to reduce blind spots in a space, to increase redundancy by increasing overlapped portions in images captured by a plurality of cameras, or the like.

As indicated by an arrow #51-3, an image captured by the sensing camera 62-3 is also added with a time stamp and transmitted to the cloud server 101.

Figure 13:
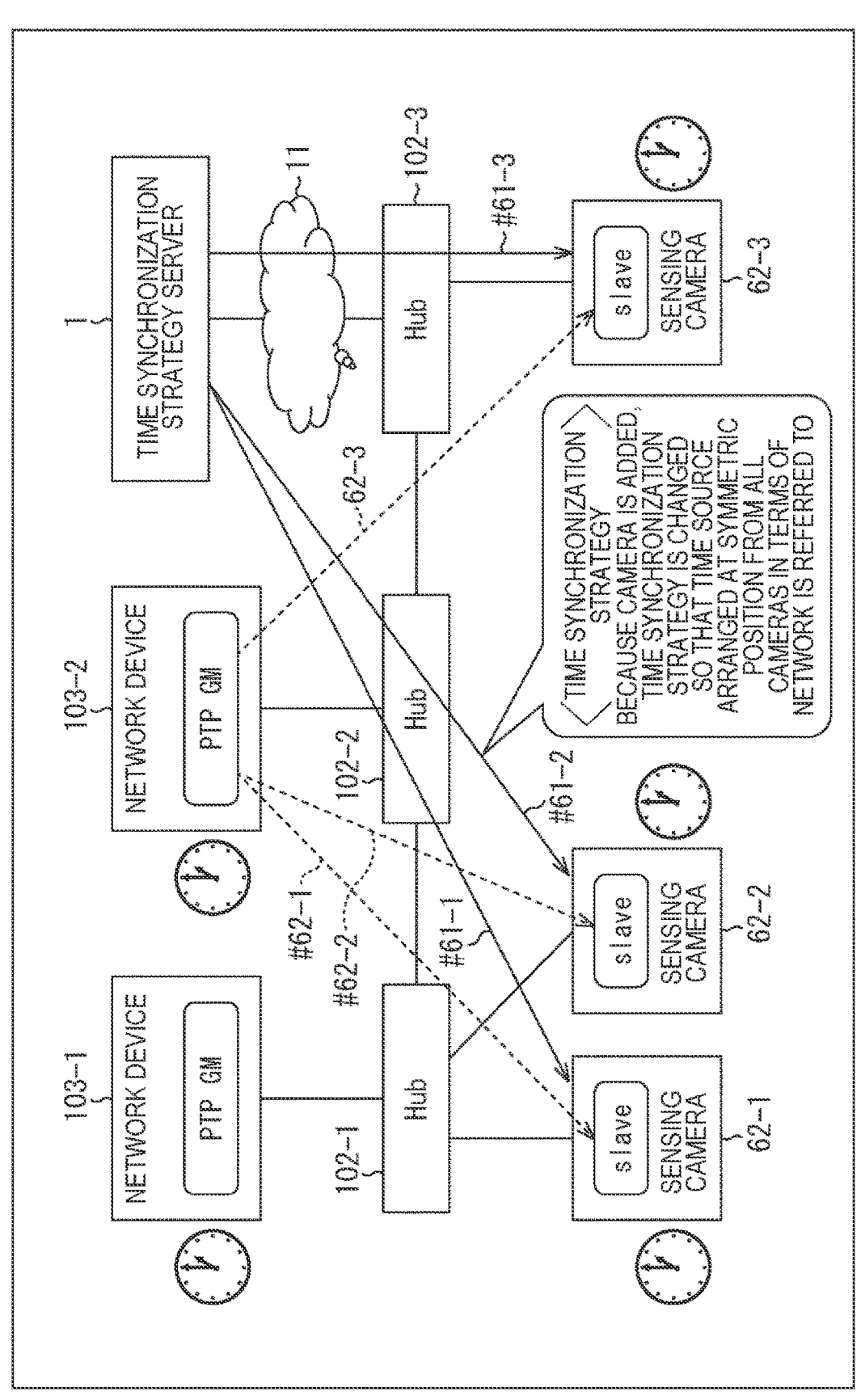
FIG. 13 is a diagram illustrating an example of time synchronization in a configuration illustrated in FIG. 12.

FIG. 13 is a diagram illustrating an example of time synchronization in a configuration illustrated in FIG. 12.

In this example, the sensing camera 62-3 is connected to the Hub 102-3.

In a case of the configuration illustrated in FIG. 13, a time source at which distances from all the sensing cameras via the network are uniform is the PTP GM included in the network device 103-2. From a viewpoint of accuracy of entire time synchronization, it is desirable that all the sensing cameras including the sensing cameras 62-1 and 62-2 installed earlier acquire time information from the PTP GM included in the network device 103-2.

For each of the sensing cameras, it is better to acquire the time information from a nearest time source, but for the sensing cameras overall, it is desirable to acquire the time information from the PTP GM included in the network device 103-2 for the following reasons.

Times of all the sensing cameras are not inconsistent (times of different time sources may not match).

It is more desirable that all the sensing cameras are synchronized with a certain degree of accuracy than that there is one sensing camera with significantly poor time synchronization accuracy.

In this case, as indicated by arrows #61-1 to #61-3, the time synchronization strategy server 1 transmits time synchronization strategy information to the sensing cameras 62-1 to 62-3, and synchronizes the time on the basis of the time information from the PTP GM included in the network device 103-2. That is, the sensing cameras 62-1 and 62-2 are instructed to update the time synchronization strategy.

The sensing cameras 62-1 to 62-3 synchronize the time on the basis of the time information transmitted from the network device 103-2 as indicated by arrows #62-1 to #62-3, respectively.

Such a dynamic setting of time synchronization is performed not only when a sensing camera is added but also when various changes in environment occur, such as when an installation position of a sensing camera moves, or when the number of sensing cameras decreases due to a failure or the like.

With such a setting, a store operator can appropriately set time synchronization even without skills of the time synchronization.

Configuration and Operation of Time Synchronization Strategy Server 1

Configuration of Time Synchronization Strategy Server 1

Figure 14:
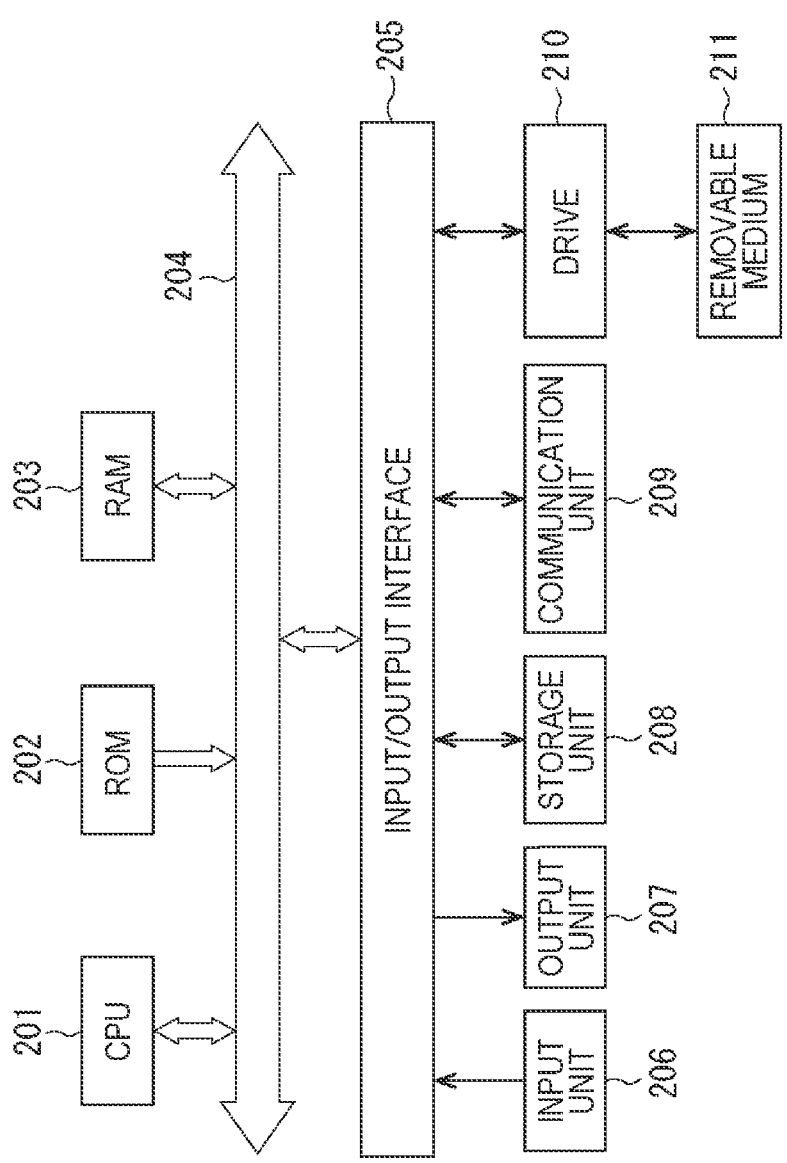
FIG. 14 is a block diagram illustrating an example of a configuration of hardware of a time synchronization strategy server.

FIG. 14 is a block diagram illustrating an example of a configuration of hardware of the time synchronization strategy server 1.

The time synchronization strategy server 1 is implemented by a computer having a configuration as illustrated in FIG. 14. The time synchronization strategy server 1 may be implemented by a plurality of computers.

A central processing unit (CPU) 201, a read only memory (ROM) 202, and a random access memory (RAM) 203 are interconnected via a bus 204.

An input/output interface 205 is further connected to the bus 204. An input unit 206 including a keyboard, a mouse, and the like, and an output unit 207 including a display, a speaker, and the like are connected to the input/output interface 205.

Furthermore, the input/output interface 205 is connected to a storage unit 208 including a hard disk, a non-volatile memory, or the like, to a communication unit 209 including a network interface or the like, and to a drive 210 that drives a removable medium 211. Communication via the network 11 or the like is performed by the communication unit 209.

Figure 15:
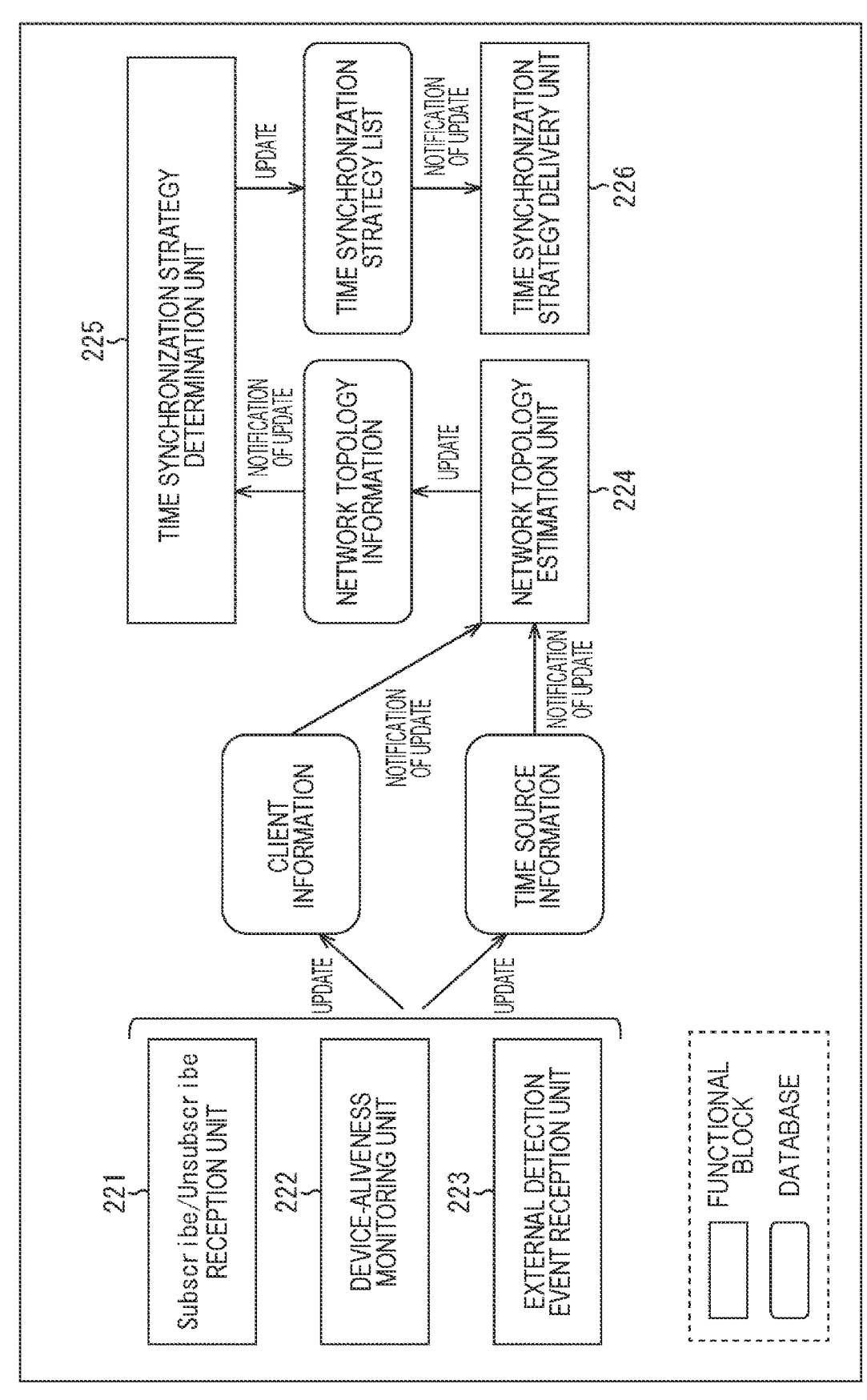
FIG. 15 is a block diagram illustrating an example of a functional configuration of a time synchronization strategy server.

FIG. 15 is a block diagram illustrating an example of a functional configuration of the time synchronization strategy server 1.

At least a part of the functional units illustrated in FIG. 15 is implemented by executing a predetermined program by the CPU 201 in FIG. 14. Functions of the time synchronization strategy server 1 in the intelligent sensor system described with reference to FIG. 10 and the like will be described as appropriate.

As illustrated in FIG. 15, in the time synchronization strategy server 1, there are implemented a Subscribe/Unsubscribe reception unit 221, a device-aliveness monitoring unit 222, an external detection event reception unit 223, a network topology estimation unit 224, a time synchronization strategy determination unit 225, and a time synchronization strategy delivery unit 226.

The Subscribe/Unsubscribe reception unit 221 receives a Subscribe from a client device requiring time synchronization or from a device serving as a time source.

In a case where the Subscribe/Unsubscribe reception unit 221 receives the Subscribe from the client device requiring time synchronization, the Subscribe/Unsubscribe reception unit 221 updates client information on the basis of device information, and additionally registers the client device requiring time synchronization. At a time of transmission of the Subscribe, the device information is transmitted from the client device requiring the time synchronization.

The client information is a database that holds a list of client devices requiring time synchronization. The client information holds an IP address of a client device, type of the device, use of the device, and the like, for which time synchronization is required.

In a case where registered content of the client information is updated, information representing the update is supplied to the network topology estimation unit 224.

Furthermore, in a case where the Subscribe/Unsubscribe reception unit 221 receives a Subscribe from a device serving as the time source, the Subscribe/Unsubscribe reception unit 221 updates time source information on the basis of device information, and additionally registers the device serving as a time source. At a time of transmission of the Subscribe, the device information is transmitted from a device, such as a network device having a function of an NTP server or a network device having a function of a PTP GM, serving as a time source.

The time source information is a database that holds a list of devices serving as time sources. The time source information holds a type of time source, additional information according to the type of time source, and the like. Examples of the type of time source include NTP, PTP, GPS, and the like. The additional information includes, for example, information representing accuracy of each time source. In a case where the type of time source is NTP, information of a Stratum or the like is also held as appropriate.

In a case where registered content of the time source information is updated, information representing the update is supplied to the network topology estimation unit 224. The client information and the time source information are stored in, for example, the storage unit 208 (FIG. 14).

The Subscribe/Unsubscribe reception unit 221 receives an Unsubscribe from a device that has already been Subscribed, and deletes the registration. In a case where the Subscribe is performed again from the device that has already been Subscribed, the Subscribe/Unsubscribe reception unit 221 updates the registered content of the client information and of the time source information.

The device-aliveness monitoring unit 222 monitors an aliveness status of the device registered in the client information or time source information (status as to whether or not the device is normally operating).

As a method for monitoring the aliveness status, there is a monitoring method based on whether or not there is a response to ping (RFC1122). Furthermore, there is a monitoring method based on whether or not communication necessary for time synchronization is being performed. In a case where a monitoring target device is a network device having a function of a PTP GM, the aliveness status is monitored on the basis of whether or not a Sync message, a DelayReqest message, or the like is multicast.

In a case where the device-aliveness monitoring unit 222 judges that the monitoring target device is not alive, the device-aliveness monitoring unit 222 deletes the registration of the device from the client information and the time source information. With this arrangement, it is possible to prevent registration of a device having been disappeared from the network without performing Unsubscribe from remaining.

The external detection event reception unit 223 functions as an interface for receiving Subscribe/Unsubscribe, addition of a device, deletion of a device, and a change in a state of a device. An input via a route other than normal aliveness monitoring, such as addition of a device by manual input, is received by the external detection event reception unit 223. The external detection event reception unit 223 updates the client information and the time source information according to the received content.

The network topology estimation unit 224 estimates a network topology on the basis of a list of devices registered in the client information or in the time source information. As the network topology, for example, how each device is arranged on the network is estimated.

For example, the network topology is estimated by inquiring each client device about a delay time to the time source from which time information is acquired. The client device can usually measure a propagation delay to a time source according to a time synchronization protocol.

Furthermore, the network topology is estimated by inquiring each client device whether or not there is, in the same LAN, a time source from which the time information is acquired. The client device can estimate whether or not there is the time source in the same LAN, by issuing ping (RFC1122) with a limited Time To Live (TTL) to the time source.

The network topology estimation unit 224 updates network topology information as appropriate on the basis of a result of the estimation. The network topology information is a database that holds the result of the estimation by the network topology estimation unit 224.

Figure 16:
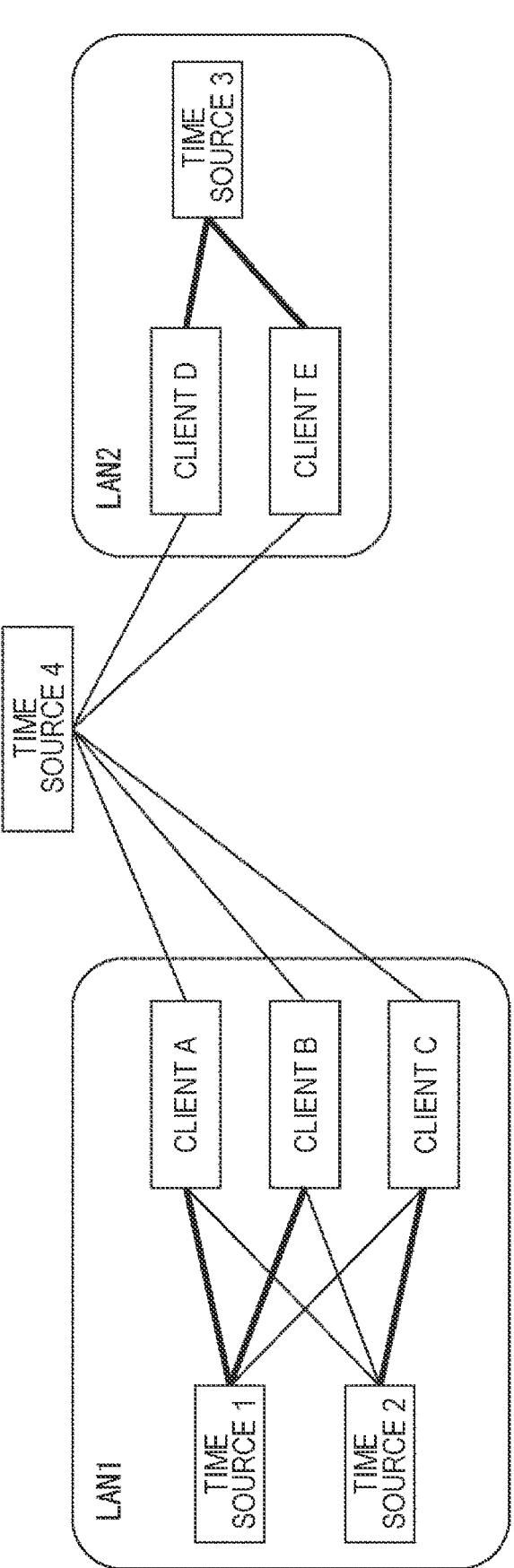
FIG. 16 is a diagram illustrating an example of a configuration of a network.

FIG. 16 is a diagram illustrating an example of a configuration of a network.

In the example in FIG. 16, two LANs, a LAN 1 and a LAN 2, are illustrated. Clients A to C are illustrated as client devices on the LAN 1, and time sources 1, 2 are illustrated as time sources on the LAN 1. Furthermore, clients D, E are illustrated as client devices on the LAN 2, and a time source 3 is illustrated as a time source on the LAN 2. The clients A to E can utilize a time source 4, which is a time source outside the LAN 1 and the LAN 2.

Thickness of each of straight lines connecting the client devices and the time sources represents network reachability. The thicker the straight line, the less the propagation delay.

In a case where each such client device is registered in the client information and each time source is registered in the time source information, the network topology estimation unit 224 estimates a network topology on the basis of a delay time matrix as illustrated in FIG. 17.

In the example in FIG. 17, because time sources reachable from the clients A to C are the same, it is estimated that the clients A to C are arranged on the same LAN. Furthermore, because time sources reachable from the clients D, E are the same, it is estimated that the clients D, E are arranged on the same LAN.

Thus, arrangement of each of the devices on the network is estimated on the basis of a status of communication between the respective client devices and the time sources from which time information of the respective client devices is acquired. The arrangement of each of the devices on the network may be estimated on the basis of another communication status such as an error rate of communication, instead of the propagation delay time.

In a case where content of the network topology information representing such an estimation result is updated, information representing the update is supplied to the time synchronization strategy determination unit 225.

The time synchronization strategy determination unit 225 determines a time synchronization strategy of each client device on the basis of the network topology information. The optimal time synchronization strategy varies depending on the type of a client device, the use of the client device, and the like. For example, the time synchronization strategy for each type and use of the client device is designed by, for example, the administrator of the time synchronization strategy server 1 according to the network topology.

In a case where there is a plurality of candidates for the time synchronization strategy, the time synchronization strategy to be actually used is determined on the basis of a priority set for each candidate. If performance by operation using a time synchronization strategy candidate with a high priority is insufficient, a time synchronization strategy candidate with a next higher priority may be switched to, by which time synchronization strategies to be set for the respective client devices may be determined.

In the intelligent sensor system described with reference to FIG. 10 and the like, for example, a time synchronization strategy is determined as follows.
(1) Selection of Time Source The time source is selected as follows from among the time sources from which all the sensing cameras can acquire the time information.

(1-1) If there is a GPS, the GPS is selected. If there is no GPS, a PTP is selected. If there is no PTP, an NTP is selected.

(1-2) In a case where there is a plurality of time sources corresponding to the selection method (1-1), a time source having a small difference in propagation delay time from each sensing camera is selected.

(1-3) In a case where it is difficult to narrow down the candidates with the selection method (1-2), a time source having a short propagation delay time from each sensing camera is selected.

(2) Selection of Behavior of Time Adjustment

Whether the time is adjusted by using the Step adjustment or the Slew adjustment is selected according to an application or the like.

A time synchronization strategy representing such selected content is determined by the time synchronization strategy determination unit 225, and registered on a time synchronization strategy list.

The time synchronization strategy list is a database that holds time synchronization strategies of the respective client devices, the time synchronization strategies being determined by the time synchronization strategy determination unit 225. Whether a different time synchronization strategy is used or the same time synchronization strategy is used for each client device changes depending on a use or environment. In a case where registered content of the time synchronization strategy list is updated, information representing the update is supplied to the time synchronization strategy delivery unit 226.

To a client device that has already been Subscribed, the time synchronization strategy delivery unit 226 delivers time synchronization strategy information representing a time synchronization strategy for each client device. In a case where the time synchronization strategy is updated, the time synchronization strategy information is delivered to a target client device.

<Operation of Time Synchronization Strategy Server 1>

Processing by the time synchronization strategy server 1 having the above configuration will be described.

Update of Client Information/Time Source Information

Figure 18:
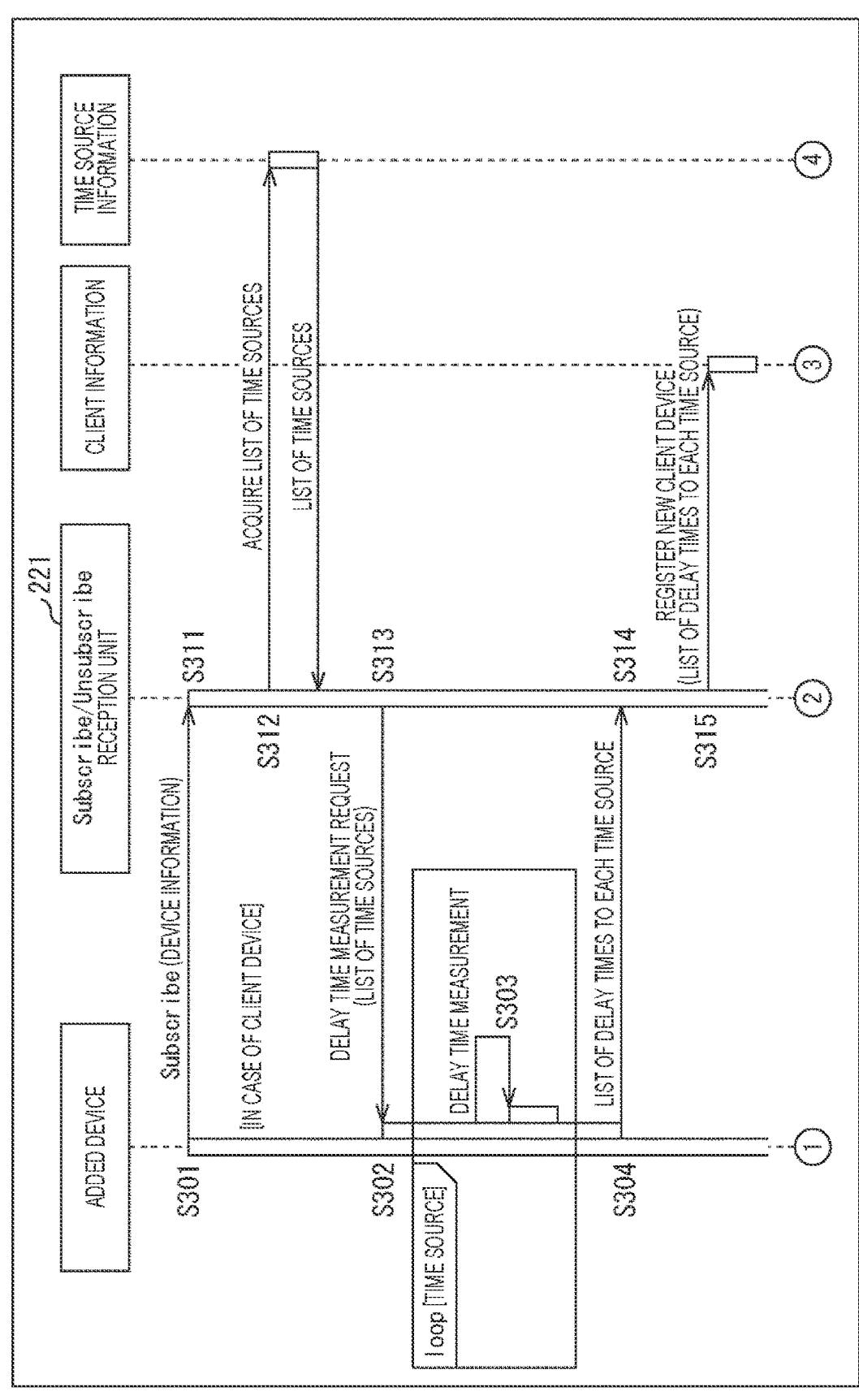
FIG. 18 is a flowchart illustrating a series of processing by the time synchronization strategy server.

Processing in a case where a device is added will be described with reference to the flowchart in FIGS. 18 and 19.

In Step S301, the added device transmits a Subscribe including device information.

In Step S311, the Subscribe/Unsubscribe reception unit 221 receives the Subscribe transmitted from the added device.

In a case where the added device is a client device, in Step S312, the Subscribe/Unsubscribe reception unit 221 acquires a list of time sources (devices serving as time sources) from time source information.

In Step S313, the Subscribe/Unsubscribe reception unit 221 transmits the list of the time sources to the client device and requests measurement of a delay time.

In Step S302, the client device receives information transmitted from the Subscribe/Unsubscribe reception unit 221.

In Step S303, the client device performs communication with each of the time sources registered on the list, and measures delay times.

In Step S304, the client device transmits, to the time synchronization strategy server 1, a list of the delay times to the respective time sources.

In Step S314, the Subscribe/Unsubscribe reception unit 221 receives the list of the delay times transmitted from the client device.

In Step S315, the Subscribe/Unsubscribe reception unit 221 registers the information of the client device on the client information. On the basis of the delay time list transmitted from the client device, the Subscribe/Unsubscribe reception unit 221 registers information of the delay times to the respective time sources as the information of the client device.

In a case where the added device is a client device, the client information is updated as described above.

Figure 19:
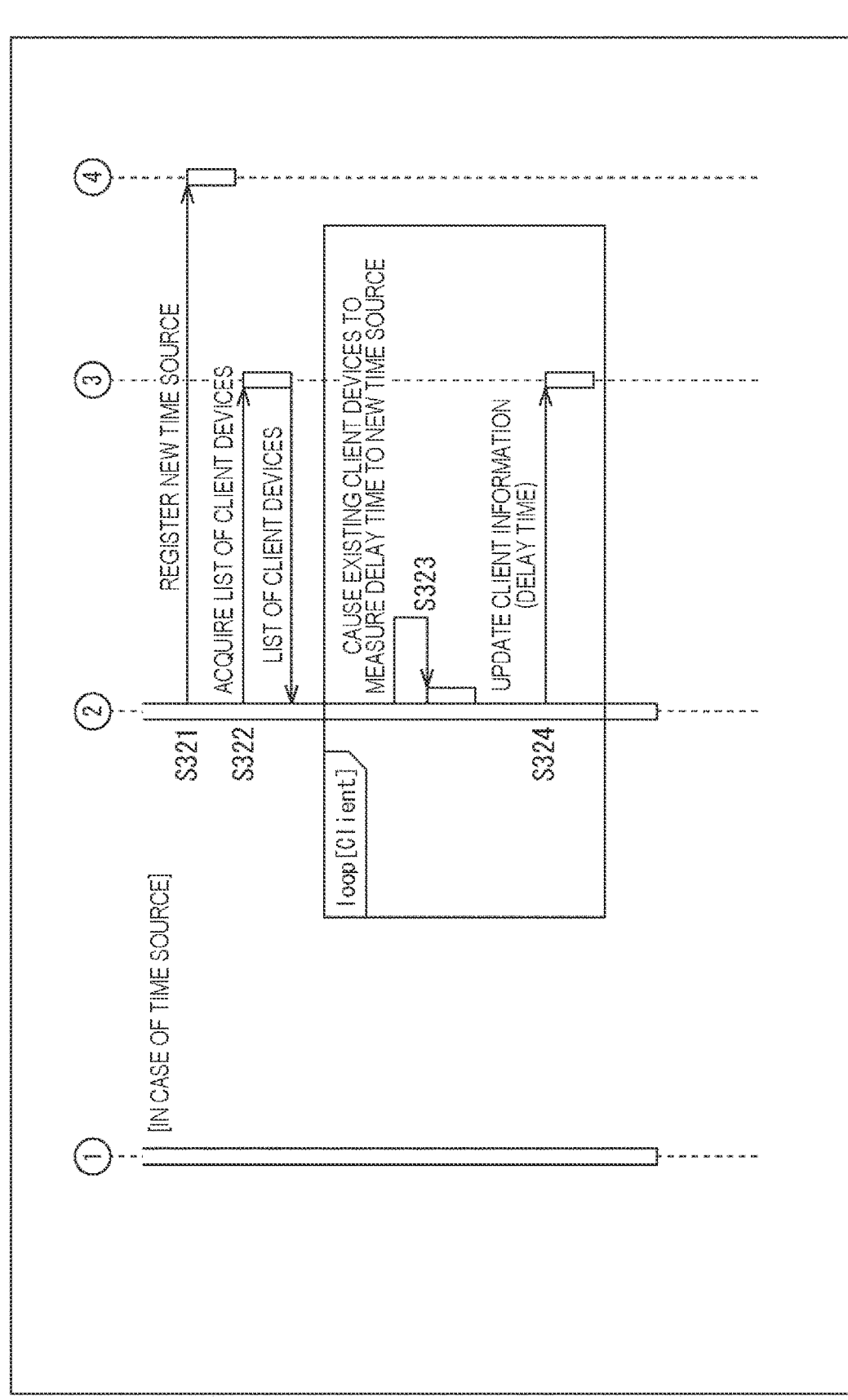
FIG. 19 is a flowchart following FIG. 18 illustrating a series of processing by the time synchronization strategy server.

Meanwhile, in a case where the added device is a time source, in Step S321 in FIG. 19, the Subscribe/Unsubscribe reception unit 221 registers information of the added time source in the time source information.

In Step S322, the Subscribe/Unsubscribe reception unit 221 acquires a list of the client devices from the client information.

In Step S323, the Subscribe/Unsubscribe reception unit 221 identifies existing client devices on the basis of the list, and causes the existing client devices to measure a delay time to a new time source.

In each of the existing client devices, a delay time to the new time source is measured in response to a request by the Subscribe/Unsubscribe reception unit 221. Information representing a result of the measurement is transmitted to the time synchronization strategy server 1 and acquired by the Subscribe/Unsubscribe reception unit 221.

In Step S324, the Subscribe/Unsubscribe reception unit 221 registers, in the client information, information about the delay time to the new time source measured by the existing client devices.

In a case where the added device is a time source, the client information and the time source information are updated as described above.

Setting of Time Synchronization Strategy

Figure 20:
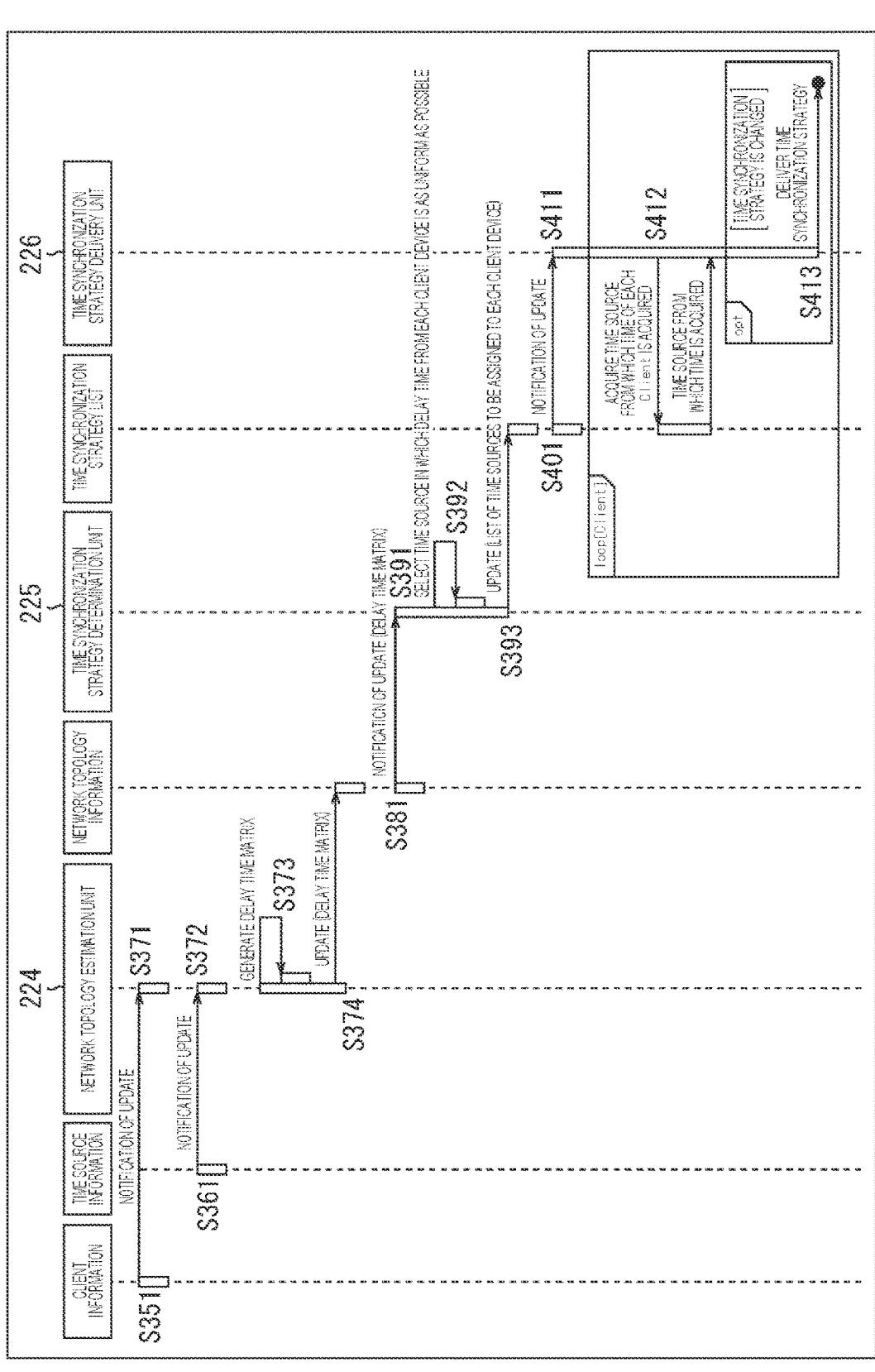
FIG. 20 is another flowchart illustrating a series of processing by the time synchronization strategy server.

A series of processing for setting a time synchronization strategy will be described with reference to the flowchart in FIG. 20.

In a case where the client information is updated, the update is notified to the network topology estimation unit 224 in Step S351.

Furthermore, in a case where the time source information is updated, the update is notified to the network topology estimation unit 224 in Step S361.

In Step S371, the network topology estimation unit 224 receives a notification of the update of the client information.

In Step S372, the network topology estimation unit 224 receives a notification of the update of the time source information.

In Step S373, the network topology estimation unit 224 generates a delay time matrix as described with reference to FIG. 17, on the basis of the delay time between the time source and each of the client devices included in the updated client information.

In Step S374, the network topology estimation unit 224 estimates a network topology on the basis of the delay time matrix, and updates the network topology information on the basis of a result of the estimation.

In a case where the network topology information is updated, the update is notified to the time synchronization strategy determination unit 225 in Step S381.

In Step S391, the time synchronization strategy determination unit 225 receives a notification of the update of the network topology information.

In Step S392, on the basis of the updated network topology information, the time synchronization strategy determination unit 225 selects a time source in which the delay time from each client device is as uniform as possible.

In Step S393, the time synchronization strategy determination unit 225 changes, on the basis of a selection result of the time source, the time source (the time source from which the time information is acquired) to be assigned to each client device, and updates the time synchronization strategy list.

In a case where the time synchronization strategy list is updated, the update is notified to the time synchronization strategy delivery unit 226 in Step S401.

In Step S411, the time synchronization strategy delivery unit 226 receives a notification of the update of the time synchronization strategy information.

In Step S412, from the time synchronization strategy list, the time synchronization strategy delivery unit 226 acquires a time source from which the time information of each client device is acquired.

In a case where there is any client device having a time source from which the time information is acquired and in which a change has occurred, in Step S413, the time synchronization strategy delivery unit 226 delivers the time synchronization strategy information to the client device having the time source in which the change has occurred. The time synchronization strategy information delivered here is updated time synchronization strategy information including time source information specifying a new time source.

With the above processing, it is possible to determine an optimal time synchronization strategy as operation of the client devices overall in consideration of, for example, a requirement of time synchronization corresponding to use, and to set the optimal time synchronization strategy in each client device. For example, it is possible to set different time synchronization strategies for each of the client devices having different uses in the same network.

By improving accuracy of the time synchronization, it is possible to improve performance of an application or service implemented by using a client device.

Furthermore, it is possible to cause the time synchronization strategies of the respective client devices to follow various changes in environment such as a change in arrangement of the client devices and a change in the number of client devices. Furthermore, it is possible to cause the time synchronization strategies to automatically follow without operation by an administrator.

Because the time synchronization strategies of the plurality of client devices are set by the time synchronization strategy server 1, it is possible to intensively maintain the time synchronization strategies. For example, by the administrator of the time synchronization strategy server 1 changing a setting of the time synchronization strategies, the change can be reflected in all the target client devices.

Maintenance of the time synchronization strategies is facilitated because settings of the time synchronization strategies of the respective client devices do not need to be maintained individually.

Configuration of Client Device

Figure 21:
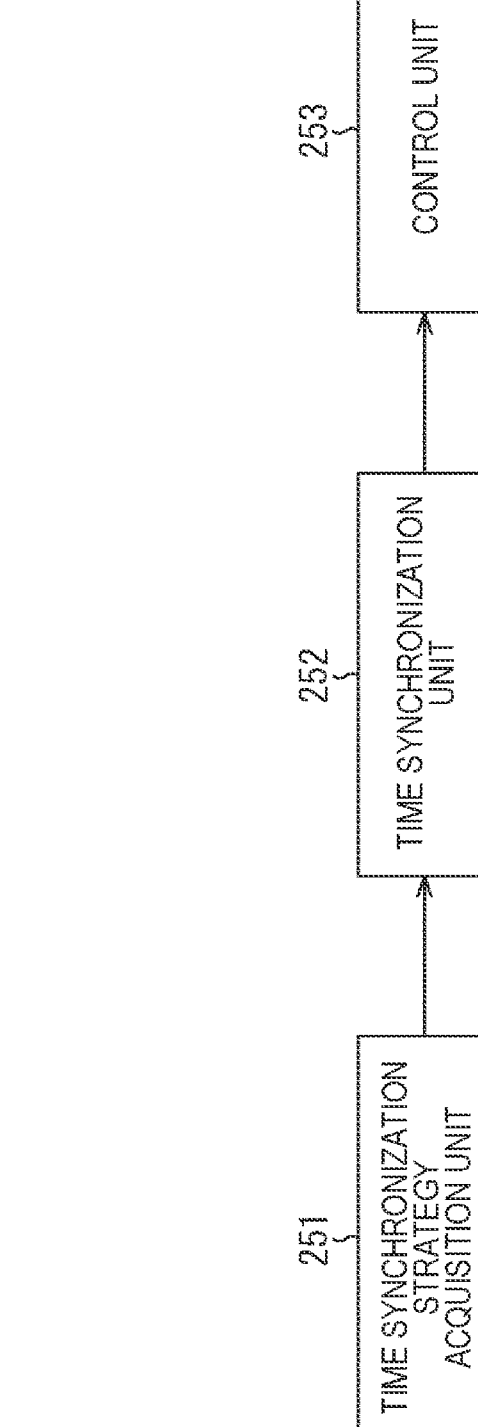
FIG. 21 is a block diagram illustrating a functional configuration example of a client device.

FIG. 21 is a block diagram illustrating a functional configuration example of a client device.

Each functional configuration illustrated in FIG. 21 is implemented by executing a predetermined program by a CPU of a computer having the configuration illustrated in FIG. 14 and mounted on each client device. In each client device, a computer having the configuration illustrated in FIG. 14 is mounted together with a hardware configuration corresponding to a type of the client device. Hereinafter, the configuration of the computer illustrated in FIG. 14 will be described as a configuration of the client device as appropriate.

As illustrated in FIG. 21, in the client device, a time synchronization strategy acquisition unit 251, a time synchronization unit 252, and a control unit 253 are implemented.

The time synchronization strategy acquisition unit 251 communicates with the time synchronization strategy server 1 by controlling the communication unit 209 (FIG. 14), and receives time synchronization strategy information delivered from the time synchronization strategy server 1. The time synchronization strategy information acquired from the time synchronization strategy server 1 is supplied to the time synchronization unit 252.

The time synchronization unit 252 synchronizes time with another client device in the same group according to a time synchronization strategy indicated by the time synchronization strategy information supplied from the time synchronization strategy acquisition unit 251.

For example, the time synchronization unit 252 acquires the time information from a time source specified by the time synchronization strategy. Furthermore, the time synchronization unit 252 adjusts a time in the client device according to a behavior specified by the time synchronization strategy. The time synchronization unit 252 outputs time information in the client device to the control unit 253.

The control unit 253 controls each unit of the client device according to a time managed by the time synchronization unit 252.

For example, in a case where the type of the client device is a robot, the control unit 253 performs control to, for example, drive a drive unit according to a time managed by the time synchronization unit 252.

Furthermore, in a case where the type of the client device is a sensing camera, the control unit 253 controls the camera to capture an image. The control unit 253 adds a time stamp representing the time managed by the time synchronization unit 252 to a captured image, and transmits the image to the cloud server 101.

Others

Another Application Example

Figure 22:
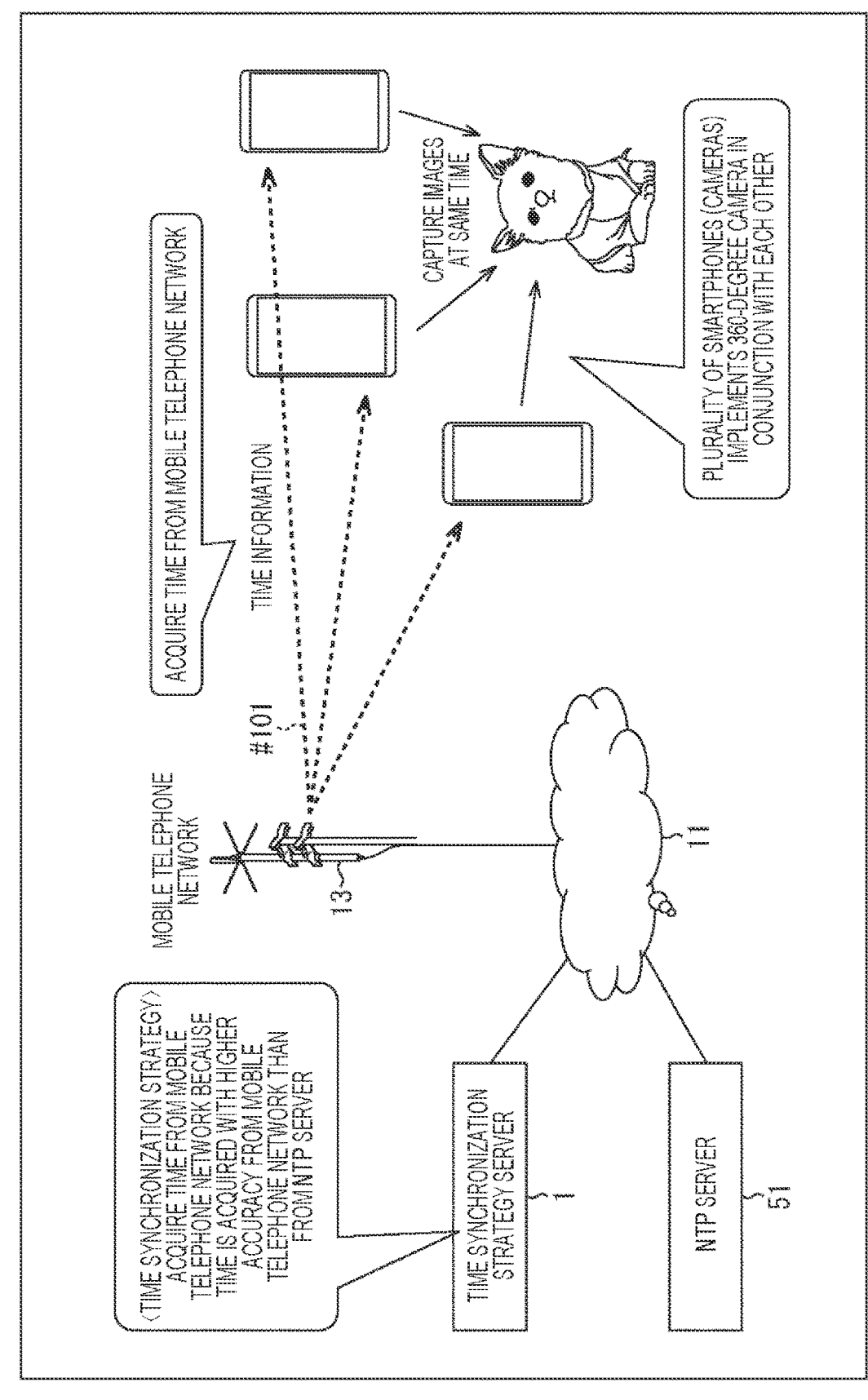
FIG. 22 is a diagram illustrating another application example.

FIG. 22 is a diagram illustrating another application example.

In the example illustrated in FIG. 22, three smartphones are illustrated as client devices. For example, an omnidirectional image of 360 degrees is generated by combining (joining) images captured by cameras mounted on the three smartphones. The application example illustrated in FIG. 22 is an application example of time synchronization to a 360-degree camera as an application.

The omnidirectional image may be generated in a smartphone or in a server on the network 11. A spatial survey may be performed by combining images captured by cameras mounted on the three smartphones.

In such an application, in order to combine images captured by a plurality of client devices without inconsistency, it is necessary to synchronize image capture timing or to attach a correct time stamp to an image obtained by the image capturing.

In the example in FIG. 22, time sources include an NTP server 51 on the network 11 and a time source of a mobile telephone network 13. A client device connected to the mobile telephone network 13 can acquire time information from a network device such as a base station.

All of the three smartphones are client devices that can be connected to the mobile telephone network 13. In the example in FIG. 22, as indicated by dashed arrows #101, according to a time synchronization strategy set by the time synchronization strategy server 1, the three smartphones acquire the time information from the mobile telephone network 13 and synchronize the time.

Figure 23:
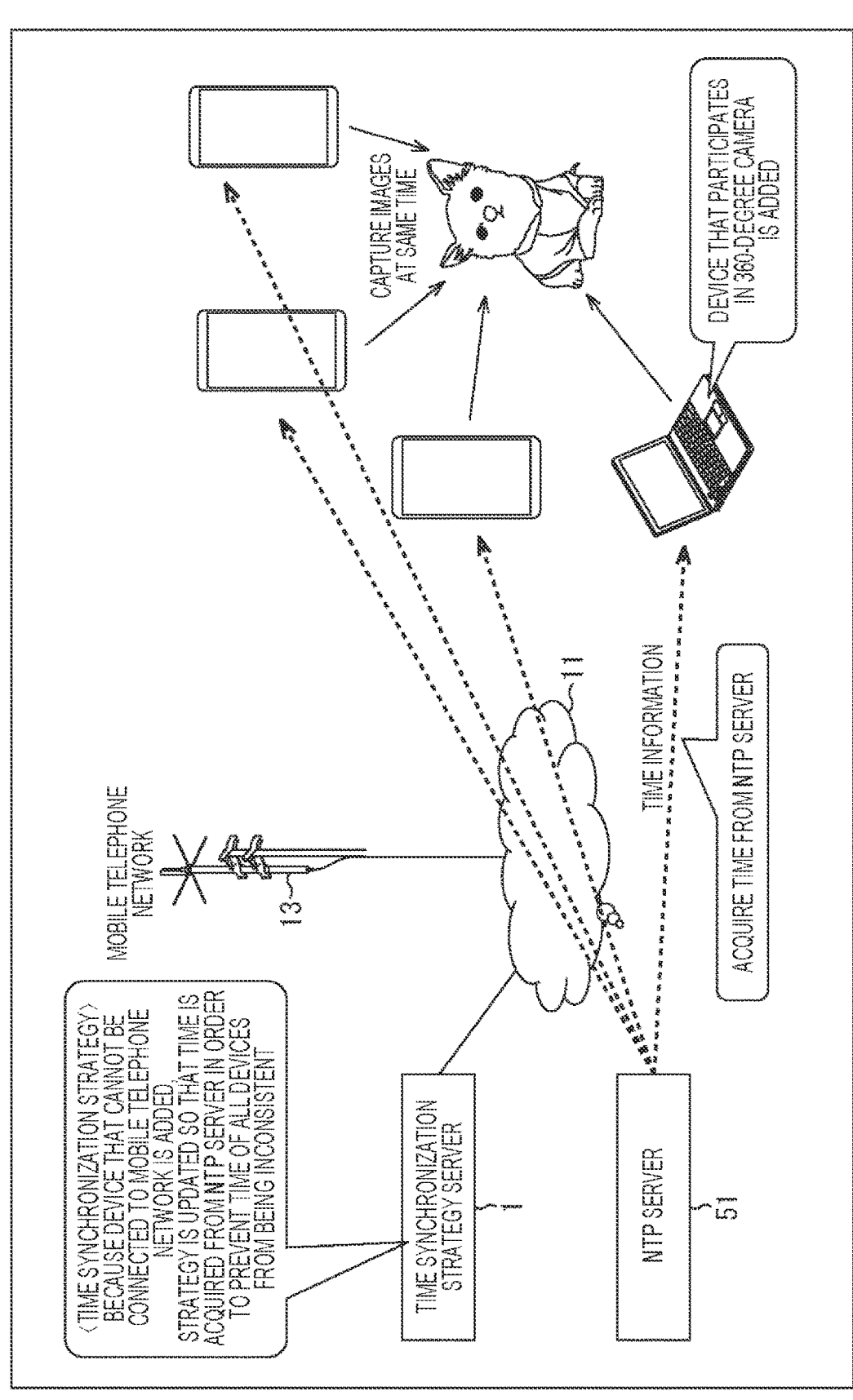
FIG. 23 is a diagram illustrating an example of a case in which a client device is added.

FIG. 23 is a diagram illustrating an example in which a client device that participates in the 360-degree camera application is added.

As illustrated in the lower right in FIG. 23, it is assumed that a laptop PC is added as a client device that participates in the 360-degree camera application. The PC is a client device that cannot be connected to the mobile telephone network 13.

In this case, the time synchronization strategy is updated so that the NTP server 51 is used as the time source in order to prevent the time of all the client devices participating in the 360-degree camera application from being inconsistent. That is, the time synchronization strategies of the respective three smartphones previously participated in the 360-degree camera application are also updated.

Each of the three smartphones and one PC acquires time information from the NTP server 51 according to the time synchronization strategy set by the time synchronization strategy server 1, and synchronizes time. Note that the NTP server 51 is a time source that can be used by all the client devices, including the PC, participating in the 360-degree camera application.

Updating the time synchronization strategies in response to the addition of the client device can improve accuracy of the 360-degree camera application.

Others

A series of the processing described above can be executed by hardware, or may be executed by software. In a case where the series of processing is executed by software, a program that constitute the software is installed to a computer incorporated in dedicated hardware, a general-purpose personal computer, or the like.

The program to be installed is provided by being recorded in the removable medium 211 illustrated in FIG. 14 configured with an optical disk (a compact disc-read only memory (CD-ROM), a digital versatile disc (DVD), or the like), a semiconductor memory, or the like. Furthermore, the program may be provided via a wired or wireless transmission medium such as a local area network, the Internet, or digital broadcasting. The program can be installed in the ROM 202 or the storage unit 208 in advance.

The program to be executed by the computer may be a program in which processing is performed in time series in an order described in the present description, or may be a program in which processing is performed in parallel or at a necessary timing, for example, when a call is made.

In the present description, the system means a set of a plurality of components (apparatuses or modules (parts) and the like), and it does not matter whether or not all the components are located in the same housing. Therefore, a plurality of apparatuses housed in separate housings and connected via the network and one apparatus in which a plurality of modules is housed in one housing are both systems.

Note that, the effects described in the present specification are merely examples and are not limited, and there may be other effects.

The embodiments of the present technology are not limited to the above-described embodiments, and various modifications can be made without departing from the gist of the present technology.

For example, the present technology may be configured as cloud computing in which one function is shared by a plurality of apparatuses via the network to make collaborative processing.

Furthermore, each step described in the flowchart described above can be executed by one apparatus or executed by a plurality of apparatuses in a shared manner.

Moreover, in a case where a plurality of processing is included in one step, the plurality of the processing included in the one step can be executed by one apparatus or by a plurality of apparatuses in a shared manner.

Combination Examples of Configurations

The present technology can also employ the following configurations:

(1)
An information processing apparatus including
a delivery unit that delivers, according to a request from a client device, information representing a time synchronization strategy designed as a method for time synchronization between the client devices forming the same group.

(2)
The information processing apparatus according to (1),
in which the group is formed by the client devices for the same use, and
the delivery unit delivers, to the client devices forming the same the group, information representing the time synchronization strategy designed according to use.

(3)
The information processing apparatus according to (1) or (2),
in which, in a case where the time synchronization strategy is updated according to a change in environment, the delivery unit delivers, to the client devices forming the group, information representing updated the time synchronization strategy.

(4)
The information processing apparatus according to any one of (1) to (3),
in which, even in a case where the client devices forming different the groups are connected to the same network, the delivery unit delivers, to the client devices forming respective the groups, information representing different the time synchronization strategies.

(5)
The information processing apparatus according to any one of (1) to (4),
in which the time synchronization strategies designed for each of the groups are changed according to input by an administrator.

(6)
The information processing apparatus according to any one of (1) to (5), further including
an estimation unit that estimates, on the basis of a status of communication between respective the client devices and a time source from which time information of respective the client devices is acquired, an arrangement relation of the client devices and the time source on a network.

(7)
The information processing apparatus according to (6), further including
a time synchronization strategy determination unit that determines, on the basis of the arrangement relation, the time synchronization strategies of respective the client devices,
in which the delivery unit delivers information representing determined the time synchronization strategies.

(8)

The information processing apparatus according to any one of (1) to (7), in which information representing the time synchronization strategy includes at least information specifying a type of a time source, and information specifying a method for adjusting time, the method using time information acquired from the time source.

(9)

A delivery method including delivering, by an information processing apparatus, according to a request from a client device, information representing a time synchronization strategy designed as a method for time synchronization between the client devices forming the same group.

(10)

An information processing terminal including a time synchronization strategy acquisition unit that requests, from an information processing apparatus that manages a time synchronization strategy designed as a method for time synchronization between client devices forming the same group, the time synchronization strategy, and receives information representing the time synchronization strategy delivered corresponding to the request, and a time synchronization unit that synchronizes, according to the time synchronization strategy, time between the client devices forming same the group.

(11)

The information processing terminal according to (10), in which the group is formed by the client devices for the same use, and the time synchronization strategy acquisition unit receives information representing the time synchronization strategy designed according to use, the time synchronization strategy being delivered to the client devices forming the group.

(12)

The information processing terminal according to (10) or (11), in which the time synchronization strategy acquisition unit receives information representing updated the time synchronization strategy delivered in a case where the time synchronization strategy is updated according to a change in environment.

(13)

The information processing terminal according to any one of (10) to (12), in which information representing the time synchronization strategy includes at least first information specifying a type of a time source, and second information specifying a method for adjusting time, the method using time information acquired from the time source.

(14)

The information processing terminal according to (13), in which the time synchronization unit synchronizes time by using, with an adjustment method specified by the second information, time information acquired from a time source specified by the first information.

(15)

A time synchronization method including, by an information processing terminal requesting, from an information processing apparatus that manages a time synchronization strategy designed as a method for time synchronization between client devices forming the same group, the time synchronization strategy, receiving information representing the time synchronization strategy delivered corresponding to the request, and synchronizing, according to the time synchronization strategy, time between the client devices forming same the group.

REFERENCE SIGNS LIST

1 Time synchronization strategy server
2 DHCP server
31 Client device
51 NTP server
52 PTP GM
61-1 to 61-3 Robot
62-1, 62-2 Sensing camera
101 Cloud server
221 Subscribe/Unsubscribe reception unit
222 Device-aliveness monitoring unit
223 External detection event reception unit
224 Network topology estimation unit
225 Time synchronization strategy determination unit
226 Time synchronization strategy delivery unit
251 Time synchronization strategy acquisition unit
252 Time synchronization unit
253 Control unit

The invention claimed is:

1. An information processing apparatus, comprising:

a central processing unit (CPU) configured to:

deliver, based on a request from a client device of a group of client devices, information representing a time synchronization strategy, wherein the information representing the time synchronization strategy is delivered to the group of client devices, the group of client devices comprises client devices for a same use, the time synchronization strategy is a method for time synchronization between the client devices, and the time synchronization strategy is based on the same use of the group of client devices.

2. The information processing apparatus according to claim 1, wherein, in a case where the time synchronization strategy is updated based on a change in environment, the CPU is further configured to deliver, to the group of client devices, information representing the updated time synchronization strategy.

3. The information processing apparatus according to claim 1, wherein, in a case where at least two groups of client devices are connected to a same network, the CPU is further configured to deliver, to each group of the at least two groups of client devices, different information representing different time synchronization strategies.

4. The information processing apparatus according to claim 3, wherein the different time synchronization strategies comprise strategies for each group of the at least two groups, and each time synchronization strategy of the different time synchronization strategies is changed based on an input by an administrator.

5. The information processing apparatus according to claim 3, wherein the CPU is further configured to:

acquire, from a time source, time information of the group of client devices; and estimate, based on a status of communication between each client device of the group of client devices and the time source, an arrangement relation of the group of client devices and the time source on the same network.

6. The information processing apparatus according to claim 5, wherein the CPU is further configured to determine, based on the arrangement relation, the different time synchronization strategies of the client devices.

7. The information processing apparatus according to claim 1, wherein the information representing the time synchronization strategy includes information specifying a type of a time source, and time information specifying a method for adjustment of time, and the CPU is further configured to acquire the time information from the time source.

8. A delivery method, comprising:

delivering, by an information processing apparatus, information representing a time synchronization strategy to a group of client devices, wherein the information representing the time synchronization strategy is delivered based on a request from a client device of the group of client devices, the group of client devices comprises client devices for a same use, the time synchronization strategy is a method for time synchronization between the client devices, and the time synchronization strategy is based on the same use of the group of client devices.

9. An information processing terminal, comprising:

a central processing unit (CPU) configured to:

request a time synchronization strategy from an information processing apparatus, wherein the information processing apparatus manages the time synchronization strategy and delivers the time synchronization strategy to a group of client devices, the group of client devices comprises client devices for a same use, and the time synchronization strategy is a method for time synchronization between the client devices;

receive information representing the time synchronization strategy, based on the request, wherein the received information representing the time synchronization strategy is based on the same use of the group of client devices; and synchronize, based on the time synchronization strategy, time between the client devices.

10. The information processing terminal according to claim 9, wherein the information processing apparatus updates the time synchronization strategy based on a change in environment, the CPU is further configured to receive information representing the updated time synchronization strategy, and the information processing apparatus delivers the information representing the updated time synchronization strategy.

11. The information processing terminal according to claim 9, wherein the information representing the time synchronization strategy includes first information specifying a type of a time source, and second information specifying a method for adjustment of time, and the second information is based on time information from the time source.

12. The information processing terminal according to claim 11, wherein the CPU is further configured to synchronize the time based on an adjustment method specified by the second information, and the time information from the time source specified by the first information.

13. A time synchronization method comprising, by an information processing terminal:

requesting a time synchronization strategy from an information processing apparatus, wherein the information processing apparatus manages the time synchronization strategy and delivers the time synchronization strategy to a group of client devices, the group of client devices comprises client devices for a same use, and the time synchronization strategy is a method for time synchronization between the client devices;

receiving information representing the time synchronization strategy, based on the request, wherein the received information representing the time synchronization strategy is based on the same use of the group of client devices; and synchronizing, based on the time synchronization strategy, time between the client devices.

* * * * *